(12) United States Patent
Muraki

(10) Patent No.: US 8,875,730 B2
(45) Date of Patent: Nov. 4, 2014

(54) CONTROL APPARATUS OF VACUUM VALVE

(75) Inventor: Yoshitami Muraki, Osaka (JP)

(73) Assignee: Torishima Pump Mfg. Co., Ltd., Osaka (JP)

( * ) Notice: Subject to any disclaimer, the term of this patent is extended or adjusted under 35 U.S.C. 154(b) by 608 days.

(21) Appl. No.: 13/258,136

(22) PCT Filed: Mar. 25, 2010

(86) PCT No.: PCT/JP2010/055253
§ 371 (c)(1),
(2), (4) Date: Nov. 3, 2011

(87) PCT Pub. No.: WO2010/113767
PCT Pub. Date: Oct. 7, 2010

(65) Prior Publication Data
US 2012/0042960 A1    Feb. 23, 2012

(30) Foreign Application Priority Data
Apr. 3, 2009    (JP) .................................. 2009-091129

(51) Int. Cl.
*E03F 1/00* (2006.01)
*F16K 31/128* (2006.01)

(52) U.S. Cl.
CPC .............. *E03F 1/007* (2013.01); *F16K 31/128* (2013.01); *Y10S 137/907* (2013.01)
USPC ........ 137/397; 137/236.1; 137/907; 137/414; 4/323; 406/17; 406/24; 406/30; 406/33; 251/102

(58) Field of Classification Search
USPC ........... 137/907, 236.1, 393, 397, 414; 4/323; 251/102; 406/14, 17, 23, 24, 30, 32, 33
See application file for complete search history.

(56) References Cited

U.S. PATENT DOCUMENTS 4,373,838 A * 2/1983 Foreman et al. ................. 406/14
4,603,709 A * 8/1986 Huisma .......................... 137/205
(Continued)

FOREIGN PATENT DOCUMENTS

CA    2024026    3/1991
CN    1186191    7/1998
(Continued)

OTHER PUBLICATIONS

Extended European Search Report issued Feb. 13, 2014 in corresponding European patent application No. 10 75 8540.

(Continued)

*Primary Examiner* — Craig Schneider
(74) *Attorney, Agent, or Firm* — Wenderoth, Lind & Ponack, LLP

(57) ABSTRACT

A control device is provided with a switching valve mechanism and first and second actuators. The switching valve mechanism is provided with a valve element for switching which is located within a casing. The valve element can linearly move between an open position at which first and second pressure change chambers of the casing are communicated with each other and a closed position at which the communication is interrupted. The valve element is held at the open position and the closed position by a first holding mechanism (toggle spring). When a float ascends to a first water level, the first actuator moves the valve element from the closed position to the open position. When the degree of vacuum within a pressure detection chamber becomes a second degree of vacuum or less, the second actuator moves the valve element from the open position to the closed position.

12 Claims, 33 Drawing Sheets

(56) References Cited

U.S. PATENT DOCUMENTS

| | | | |
|---|---|---|---|
| 4,691,731 A * | 9/1987 | Grooms et al. | 137/205 |
| 5,044,836 A * | 9/1991 | Grooms | 406/22 |
| 5,064,314 A * | 11/1991 | Grooms et al. | 406/22 |
| 5,069,243 A * | 12/1991 | Foreman | 137/205 |
| 5,114,280 A | 5/1992 | Ushitora et al. | |
| 5,282,281 A * | 2/1994 | Clear et al. | 4/434 |
| 5,588,458 A * | 12/1996 | Ushitora et al. | 137/205 |
| 5,615,701 A * | 4/1997 | Yamabe et al. | 137/205 |
| 5,871,027 A | 2/1999 | Shimizu et al. | |
| 5,918,853 A * | 7/1999 | Yamabe et al. | 251/61.5 |
| 5,979,486 A * | 11/1999 | Davidson | 137/205 |
| 6,298,870 B1 * | 10/2001 | Ohtsuka et al. | 137/205 |
| 7,013,909 B2 * | 3/2006 | Shimizu et al. | 137/205 |

FOREIGN PATENT DOCUMENTS

| | | |
|---|---|---|
| EP | 0 415 359 | 3/1991 |
| EP | 0 826 838 | 3/1998 |
| GB | 2 149 534 | 6/1985 |
| JP | 3-88621 | 4/1991 |
| JP | 7-119200 | 5/1995 |
| JP | 9-196231 | 7/1997 |
| JP | 10-61808 | 3/1998 |
| JP | 2805127 | 9/1998 |
| JP | 3459522 | 10/2003 |
| JP | 3475030 | 12/2003 |

OTHER PUBLICATIONS

International Search Report issued Jun. 8, 2010 International (PCT) Application No. PCT/JP2010/055253.

Patent Cooperation Treaty (PCT) International Preliminary Report on Patentability issued Nov. 15, 2011 in International (PCT) Application No. PCT/JP2010/055253.

* cited by examiner

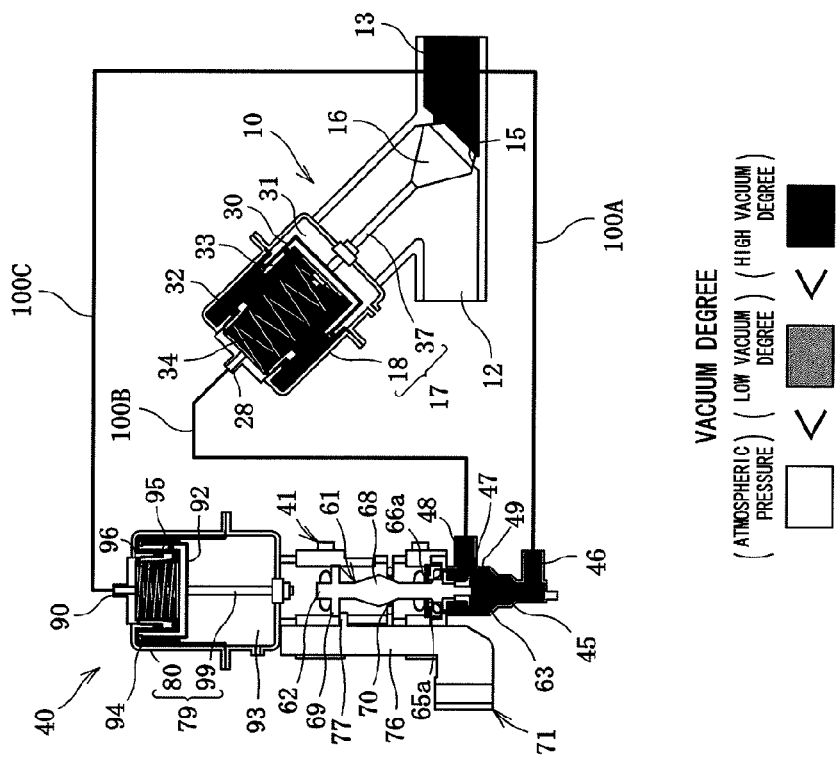

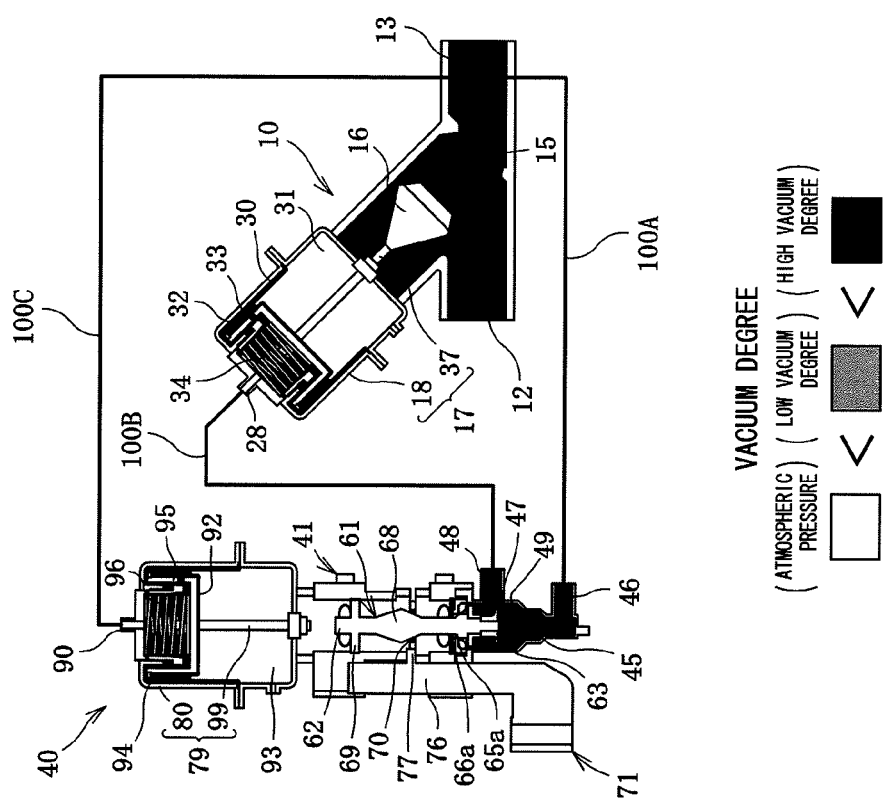

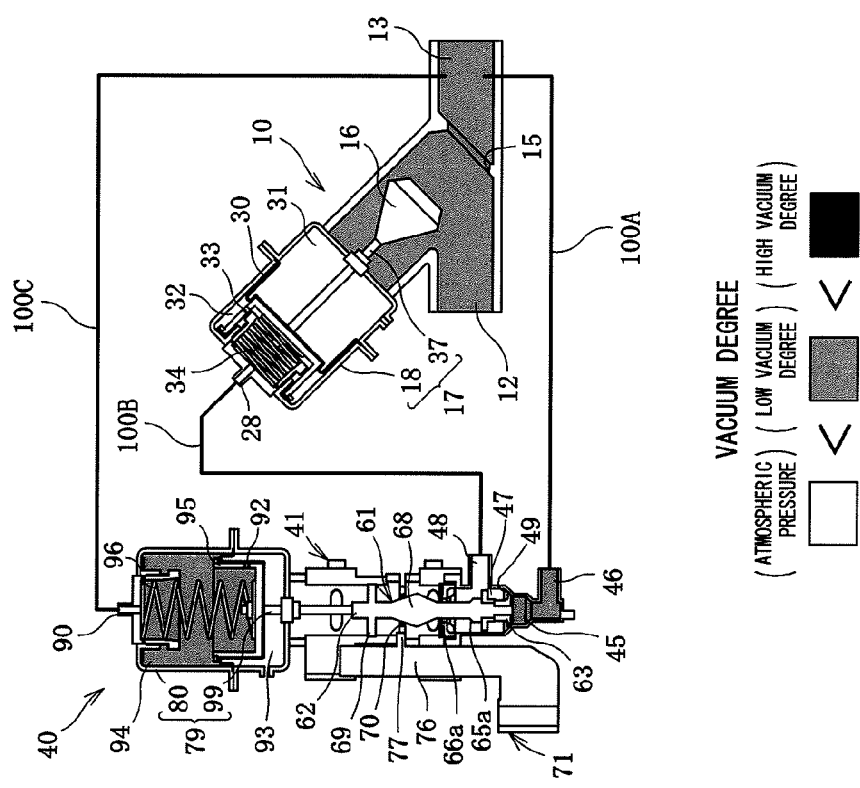

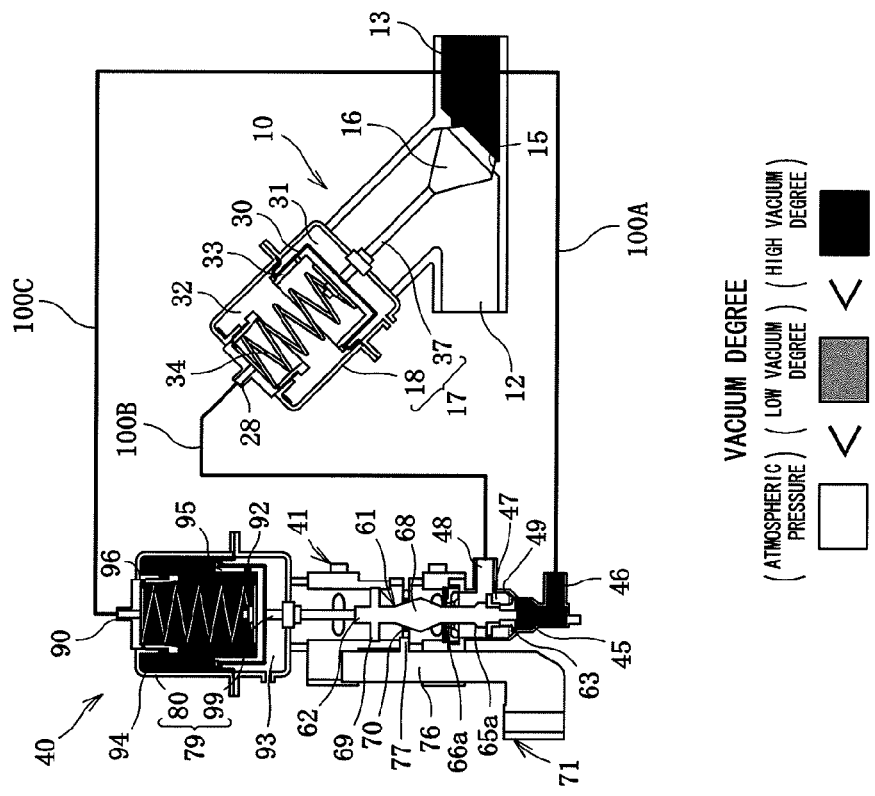

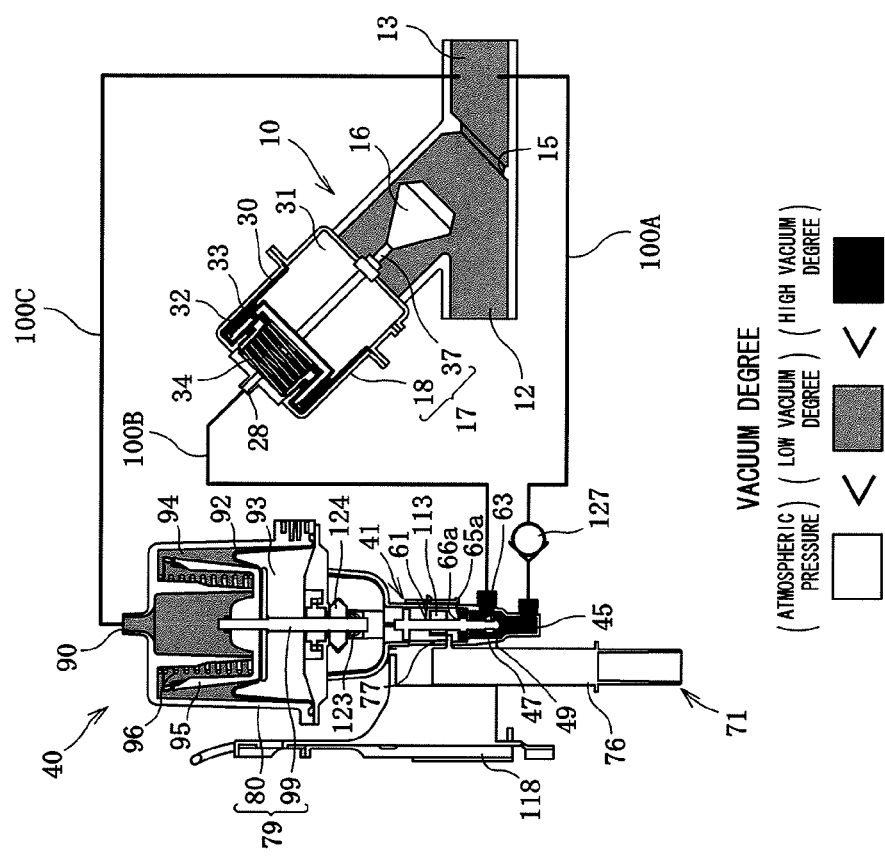

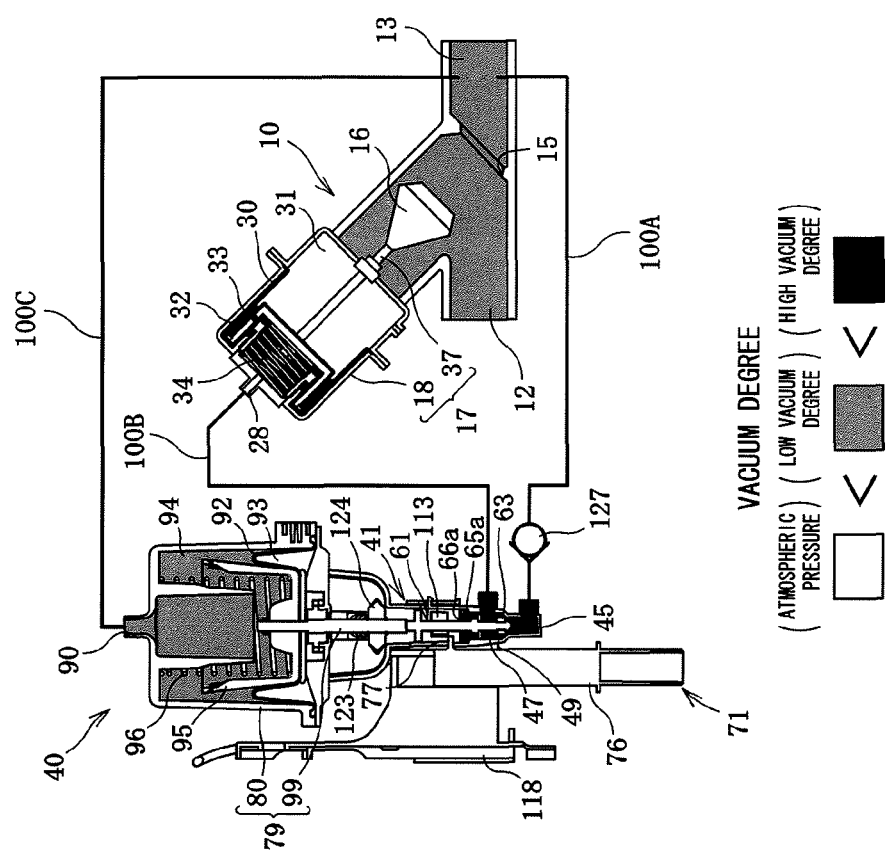

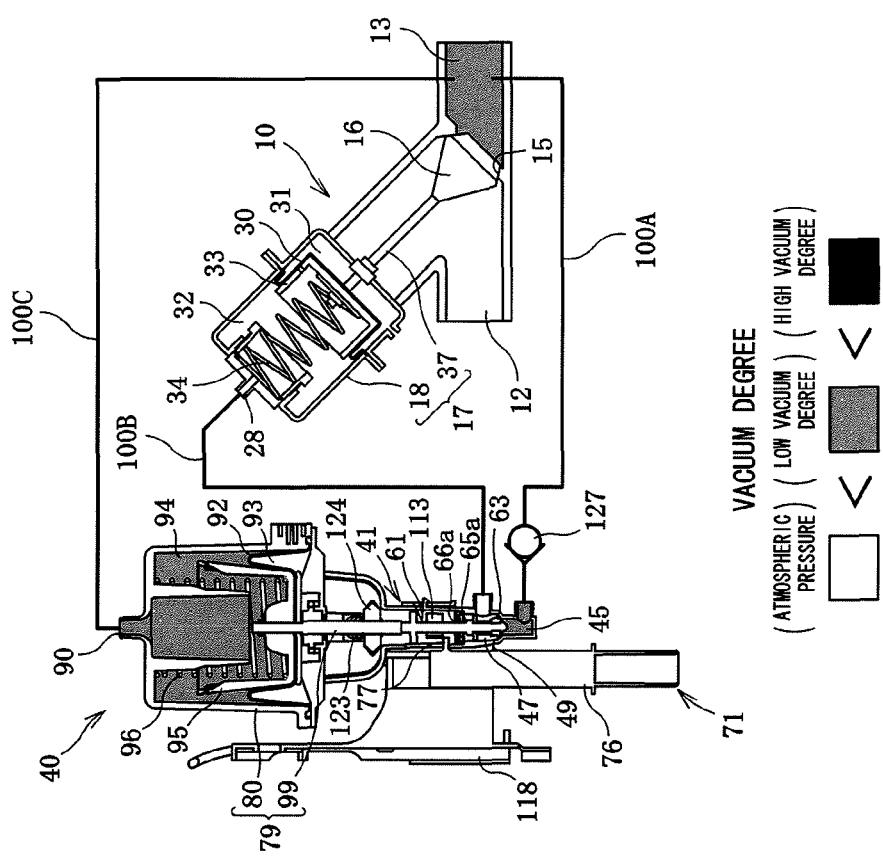

CONTROL APPARATUS OF VACUUM VALVE

TECHNICAL FIELD

The present invention relates to a control apparatus of a vacuum valve which is used in a vacuum water supply system such as a vacuum sewage line system or the like.

BACKGROUND ART

There has been known a vacuum type water supply system which supplies water by utilizing vacuum suction. As one example of the vacuum water supply system, there is a vacuum type sewage line system. The vacuum type sewage line system is provided with a vacuum station, a vacuum sewage pipe, and a vacuum valve unit.

The vacuum station is provided with a vacuum pump, a water collection tank, and a pressure pump. In the vacuum sewage pipe, its upstream side is connected to a vacuum valve unit, and its downstream side is connected to the water collection tank of the vacuum station. The vacuum pump of the vacuum station generates a negative pressure within the vacuum sewage pipe. Due to this negative pressure within the vacuum sewage pipe, waste water within the vacuum valve unit is drained to the water collection tank of the vacuum station through the vacuum sewage pipe. The waste water reserved in the water collection tank is fed further downstream by the pressure pump.

The vacuum valve unit is provided with a water storage basin which temporarily reserves the waste water fed from the upstream side. The vacuum valve is interposed between a water suction pipe which lower end is positioned within the water storage basin, and the vacuum sewage pipe. The vacuum valve shuts off communication between the water suction pipe and the vacuum sewage pipe when the valve is closed, and allows communicates between the water suction pipe and the vacuum sewage pipe when the valve is open so as to supply the waste water within the water storage basin to the vacuum sewage pipe.

The vacuum valve is provided with a valve main body including a valve body and a valve seat, and a drive portion which drives the valve body so as to open and close. The drive portion is provided with two pneumatic chambers. The valve body is driven by a balance between a pressure difference within the pneumatic chamber and a biasing force of a biasing spring. The control apparatus of the vacuum valve regulates a pneumatic pressure of one (pressure chamber) of the pneumatic chambers in accordance with a water level within the water storage basin, thereby controlling an opening and closing actuation of the vacuum valve.

The control apparatus of the vacuum valve includes a pneumatic type and a mechanical type. The pneumatic type regulates the pneumatic pressure of the pressure chamber in accordance with a pressure fluctuation corresponding to the water level within the water storage basin, which is detected by utilizing a diaphragm (e.g., see Patent Document 1). On the other hand, the mechanical type utilizes ascent and descent of a float in accordance with the water level within the water storage basin for regulating the pneumatic pressure of the pressure chamber. The mechanical type is superior in motion stability or the like as compared with the pneumatic type.

A vacuum type sewage line system to which the mechanism type control apparatus is applied is shown in FIG. 19. If a water level of waste water within a water storage basin 201 reaches a first water level HWL due to an inflow of the waste water from a natural falling pipe 200 connected to home sewage equipment, a control apparatus 203 opens a vacuum valve 204 in response to ascent of a float 202. Accordingly, a vacuum water supply pipe 205 connected to a vacuum station (not shown) is communicated with a water suction pipe 206. As a result, the waste water within the water storage basin 201 is drained to a downstream side via the vacuum water supply pipe 205. If the water level within the water storage basin 201 is drained to a second water level LWL, the control apparatus 203 closes the vacuum valve 204 in response to descent of the float 202. Accordingly, the communication between the vacuum water supply pipe 205 and the water suction pipe 206 is shut off, and the drainage is stopped.

The first water level HWL opening the vacuum valve 204 is set below an opening of the natural falling pipe 200. Accordingly, a backflow of the waste water from the natural falling pipe 200 to the home sewage equipment is prevented. Further, the second water level LWL closing the vacuum valve 204 is set above a lower end opening of the water suction pipe 206. Accordingly, the vacuum valve 204 is prevented from being maintained in the valve open state in a state where the water level is lower than a lower end of the water suction pipe 206. This is because a degree of vacuum of the vacuum water supply pipe 205 is lowered (pressure rises) due to mixture of air if a draining motion is continued in the state where the water level is below the lower end of the water suction pipe 206, thereby causing a reduction of a drainage capacity of the other vacuum valve unit connected to the same vacuum station, and a system failure.

However, the mechanical type control apparatus has the following problems.

First of all, as the apparatus is used, earth and sand mixed into the waste water is accumulated within the water storage basin 201. Further, at the time of newly constructing a system (unit), there is a case that a foreign material 207 such as a timber, a segment of a pipe, or the like is left within the water storage basin 201 due to carelessness of a worker. If the foreign material 207 is positioned at a lower portion of the float 202, it obstructs the descent of the float 202. In this case, since the vacuum valve 204 cannot be closed, it is impossible to stop the drainage.

Further, since the second water level LWL is set above the lower end of the water suction pipe 206, it is impossible to discharge a scum which is mixed into the waste water. The scum becomes hard in a region of the first water level HWL, and a surface area and a thickness are gradually increased with use. As a result, the float 202 is firmly fixed when it ascends to the first water level, and comes to a state in which it cannot descend. If the scum is peeled off from a wall surface of the water storage basin 201 by coming into contact with the float 202, and is positioned at a lower portion of the float 202, it obstructs the descent of the float 202. In such cases as well, it is impossible to close the vacuum valve 204, and the drainage cannot be stopped.

Patent Document 2 discloses a control apparatus of a vacuum valve which is provided with both functions of a mechanical type and a pneumatic type. The control apparatus is provided with first and second control mechanisms. The first control mechanism is a mechanism of a three-way valve structure which switches a pressure of a gas within a pressure chamber in conjunction with ascent and descent of a float. The second control mechanism is a control mechanism of a two-way valve structure which switches the pressure of the gas within the pressure chamber in conjunction with change of a degree of vacuum within the vacuum sewage pipe. In the control apparatus, the float type first control mechanism only carries out opening of the vacuum valve, and the differential type second control mechanism only carries out closing of the vacuum valve. In other words, if the waste water is reserved to a previously set water level within the water storage basin, the first control mechanism switches the vacuum valve from a valve closed state to a valve open state, and if the water level within the water storage basin becomes equal to or less than a lower end of the water suction pipe, the second control mechanism switches the vacuum valve from the valve open state to the valve closed state. Accordingly, it is possible to discharge the scum near the bottom of the water storage basin with the waste water. As mentioned above, the control apparatus of Patent Document 2 is superior as compared with the mechanical type control apparatus in that it can suppress the problem of malfunction of the float.

In the control apparatus of Patent Document 2, the first control mechanism for valve opening actuation and the second control mechanism for valve closing actuation are separate bodies. Therefore, in order to keep the vacuum valve, which is opened by the first control mechanism, in the valve open state until the second control mechanism executes the valve closing command, it is indispensable that a check valve is provided between the first control mechanism and the pressure chamber of the vacuum valve. That is, the check valve is further necessary in addition to two control mechanisms. Further, it is necessary to complicatedly arrange an air tube in a limited narrow space within the water storage basin. Specifically, it is necessary to connect the first and second control mechanisms respectively to the pressure chamber of the vacuum valve and the vacuum sewage pipe by an air tube. In these respects, the control apparatus of Patent Document 2 is complicated and large in its structure, and a high cost is required for manufacturing and installing.

Further, in the control apparatus of Patent Document 2, there may occur a phenomenon in which the vacuum valve repeats the valve opening and the valve closing in a short period of time, i.e., a chattering phenomenon. Specifically, if the float cannot descend due to the attachment of the foreign material such as the sediment and the remaining material, or the scum in the same manner as the mechanical type control apparatus in spite that the water level within the water storage basin is sufficiently lowered, there is a case that the first control mechanism comes to such a state where it keeps on outputting the valve opening command to the vacuum valve. In this case, even if the differential type second control mechanism outputs the valve closing command and the vacuum valve is closed, the vacuum valve is opened immediately by the valve opening command of the first control mechanism. As a result, the valve opening and the valve closing of the vacuum valve are repeated in an extremely short period of time. This chattering phenomenon also causes a reduction in draining capacity of the other vacuum valve unit connected to the same vacuum station, and a system failure.

PRIOR ART DOCUMENTS

Patent Documents

Patent Document 1: Japanese Patent No. 3475030
Patent Document 2: Japanese Patent No. 2805127

DISCLOSURE OF THE INVENTION

Problems to be Solved by the Invention

An object of the present invention is to provide a control apparatus of a vacuum valve which is used in a vacuum water supply system such as a vacuum sewage line system or the like, and has an excellent performance. Specifically, a first object of the present invention is to simplify and downsize a structure. Further, a second object of the present invention is to stabilize an opening and closing motion of the vacuum valve so as to prevent occurrence of chattering.

Means for Solving the Problems

In order to achieve the above object, a control apparatus of a vacuum valve according to the present invention is a control apparatus of a vacuum valve which is interposed between one end of a water suction pipe having the other end open to a water storage basin, and a vacuum-sucked vacuum water supply pipe, the vacuum valve being opened when a degree of vacuum within a pressure chamber becomes equal to or more than a first degree of vacuum and closed when the degree of vacuum within the pressure chamber becomes lower than first degree of vacuum, including: a switching valve mechanism having a casing formed with a first pressure change chamber communicated with the vacuum water supply pipe and a second pressure change chamber communicated with a pressure chamber of the vacuum valve, a switching valve body arranged within the casing so as to be linearly movable between an open position where the first pressure change chamber is communicated with the second pressure change chamber, and a closed position where the communication between the first pressure change chamber and the second pressure change chamber is shut off, and a first retention mechanism retaining the switching valve body at the open position and the closed position by a previously set retention force; a first actuator having an opening actuation member that is attached to the casing of the switching valve mechanism so as to be linearly movable along a linear moving direction of the switching valve body in conjunction with ascent and descent corresponding to a water level of a float accommodated within the water storage basin, the opening actuation member moving the switching valve body from the closed position to the open position against the retention force of the first retention mechanism when the float ascends to a previously set first water level; and a second actuator having a switching cylinder that is attached to the casing and is formed with a pressure detection chamber communicated with the vacuum water supply pipe in an inner portion thereof, and a closing actuation member that is linearly movable in the linear moving direction of the switching valve body, the closing actuation member advancing so as to move the switching valve body from the open position to the closed position against the retention force of the first retention mechanism when a degree of vacuum within the pressure detection chamber becomes equal to or less than a second degree of vacuum.

The control apparatus moves the switching valve body of the switching valve mechanism from the closed position to the open position against the retention force of the first retention mechanism via the opening actuation member of the first actuator, in conjunction with the ascent of the float. Accordingly, the first pressure change chamber, and the second pressure change chamber of the casing come to the communicated state. As a result, the vacuum water supply pipe, the first pressure change chamber, the second pressure change chamber and the pressure chamber of the vacuum valve are communicated, and the degree of vacuum within the pressure chamber becomes equal to or more than the first degree of vacuum. Accordingly, a water shut-off valve body of the vacuum valve is moved to the open position, and the water is fed from the water suction pipe via the vacuum water supply pipe. In this case, the degree of vacuum within the pressure detection chamber of the second actuator is higher than the second degree of vacuum, and maintains the switching valve body in a state in which it is not actuated to close.

Next, if the water level within the water storage basin is lowered below the lower end of the water suction pipe, and the water suction pipe starts to suck the air, the degree of vacuum within the vacuum water supply pipe is lowered. Accordingly, the degree of vacuum within the pressure detection chamber of the second actuator becomes equal to or less than the second degree of vacuum, and the closing actuation member moves the switching valve body from the open position to the closed position against the retention force of the first retention mechanism. Further, the degree of vacuum within the pressure chamber of the vacuum valve becomes lower than the first degree of vacuum, and the water shut-off valve body is moved to the closed position. Accordingly, the feeding of water from the water suction pipe via the vacuum water supply pipe is stopped.

As mentioned above, the control apparatus according to the present invention is structured such that the pressure chamber of the vacuum valve is connected only to the second pressure change chamber of the switching valve mechanism. Further, the first pressure change chamber of the switching valve mechanism is connected to the vacuum water supply pipe. Further, the first and second pressure change chambers are switched between the communicated state and the shut off state with the opening actuation by the first actuator and the closing actuation by the second actuator, to one switching valve body. Further, the switching valve body is retained at the open position and the closed position by the retention force of the first retention mechanism when the actuator is not actuated. Accordingly, as long as the switching valve body is at the closed position and the water shut-off valve body of the vacuum valve is at the closed position, the degree of vacuum within the pressure chamber of the vacuum valve does not become equal to or more than the first degree of vacuum unless the switching valve body moves to the open position. Further, as long as the switching valve body is at the open position and the water shut-off valve body of the vacuum valve is at the open position, the degree of vacuum within the pressure chamber of the vacuum valve becomes lower than the first degree of vacuum unless the switching valve body moves to the closed position. Therefore, it is possible to reliably actuate the vacuum valve so as to open and close.

Further, the first and second actuators are integrally attached to the switching valve mechanism. Accordingly, the structure of the control apparatus is extremely simple. Further, the structure can be simplified in such a point that the air piping is necessary only for the first pressure change chamber and the second pressure change chamber of the switching valve mechanism, and the pressure detection chamber of the second actuator. As a result, it is possible to achieve a downsizing and a cost reduction of a system that is mounted with the control apparatus.

In the control apparatus of this vacuum valve, it is preferable that the second pressure change chamber of the casing of the switching valve mechanism is provided with a seal member which has a through hole communicating with ambient air, and the switching valve body blocks the through hole of the seal member in a state of being moved to the open position so as to shut off the second pressure change chamber from the ambient air, and the switching valve body opens the through hole of the seal member in a state of being moved to the closed position so as to communicate the second pressure change chamber with the ambient air. Accordingly, if the switching valve body is moved to the closed position by the second actuator, the ambient air can be introduced to the pressure chamber of the vacuum valve via the second pressure change chamber. Therefore, it is possible to reliably actuate the vacuum valve so as to close.

Effects of the Invention

The control apparatus of the vacuum valve according to the present invention is structured such that one switching valve body is actuated so as to open by the first actuator, and is actuated so as to close by the second actuator, and the open position or the close position is retained by the first retention mechanism. Therefore, as long as the switching valve body is at the closed position and the water shut-off valve body of the vacuum valve is at the closed position, the degree of vacuum within the pressure chamber of the vacuum valve does not become equal to or more than the first degree of vacuum, unless the switching valve body is moved to the open position by the first actuator. Further, as long as the switching valve body is at the open position and the water shut-off valve body of the vacuum valve is at the open position, the degree of vacuum within the pressure chamber of the vacuum valve does not become lower than the first degree of vacuum, unless the switching valve body is moved to the closed position by the second actuator. Accordingly, it is possible to reliably actuate the vacuum valve so as to open and close.

Further, since the first and second actuators are integrally assembled in the switching valve mechanism, it is possible to achieve simplification of the whole control apparatus. As a result, it is possible to simplify the system mounted with the control apparatus, and a cost reduction can be achieved as a whole.

Further, since the force which moves the switching valve body to the closed position by the closing actuation member of the second actuator is made larger than buoyancy of the float, it is possible to actuate the switching valve body so as to close in the case where the opening actuation by the first actuator and the closing actuation by the second actuator are simultaneously carried out. As a result, it is possible to prevent the chattering of the vacuum valve from being generated.

BRIEF DESCRIPTION OF THE DRAWINGS

FIG. 6B is a schematic view showing a state in which a switching valve body is actuated so as to open.

FIG. 6C is a schematic view showing a state in which a water shut-off valve body is actuated so as to open according to FIG. 6B.

FIG. 6F is a schematic view showing a changed state of the degree of vacuum caused by the valve closing actuation of the switching valve body.

FIG. 6H is a schematic view showing a changed state of the degree of vacuum caused by the valve closing actuation of the water shut-off valve body.

FIGS. 13(A) to 13(C) show an inner case of a second actuator of the control apparatus according to the third embodiment, in which FIG. 13(A) is an upward perspective view, FIG. 13(B) is a downward perspective view, and FIG. 13(C) is a side view.

FIGS. 14(A) and 14(B) show a retention member of a second retention mechanism, in which FIG. 14(A) is a perspective view and FIG. 14(B) is a plan view.

FIG. 15D is a schematic view showing a state in which air is mixed by drainage and a degree of vacuum is lowered.

FIG. 15E is a schematic view showing a state in which the switching valve body is actuated so as to close according to FIG. 15D.

FIG. 15G is a schematic view showing a state in which the water shut-off valve body is actuated so as to close according to FIG. 15F.

FIGS. 17(A) and 17(B) show a modified example of the valve gasket of the switching valve body, in which FIG. 17(A) is a side view and FIG. 17(B) is a perspective view.

FIGS. 18(A) to 18(C) show another modified example of the valve gasket of the switching valve body, in which FIG. 18(A) is a side view, FIG. 18(B) is an upward perspective view, and FIG. 18(C) is a downward perspective view.

DESCRIPTION OF REFERENCE SIGNS

Figure 1:
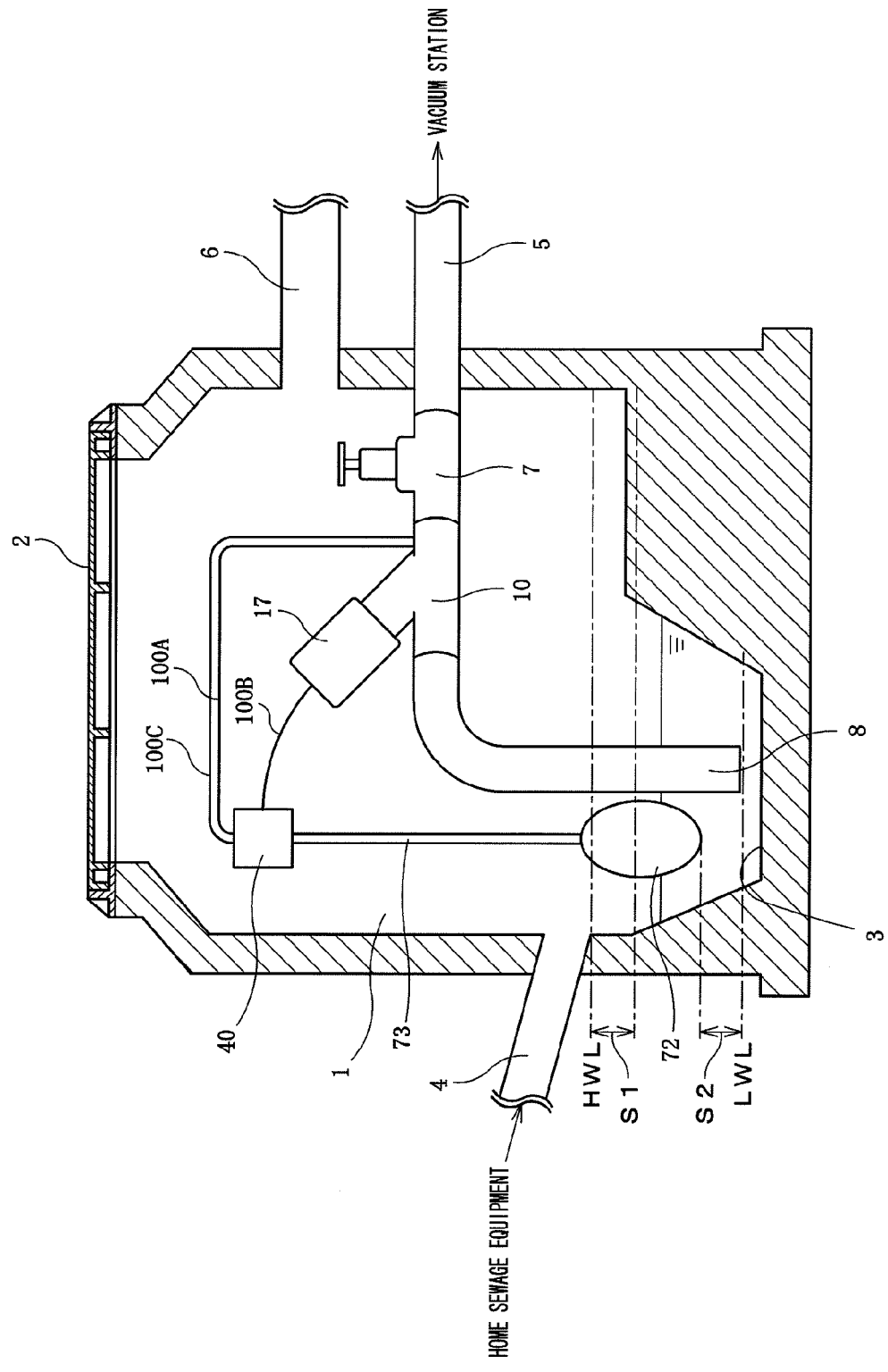
FIG. 1 is a schematic view showing a vacuum type sewage line system to which a control apparatus of a vacuum valve according to the present invention is applied.

1: water storage basin
4: natural falling pipe
5: vacuum water supply pipe
8: water suction pipe
10: vacuum valve
16: water shut-off valve body
17: water shut-off valve driving actuator
18: water shut-off cylinder
25: first fastened portion (regulating mechanism)
27: first fastening member (regulating mechanism)
30: first diaphragm
31: first reference pressure chamber
32: pressure chamber
33: water shut-off piston cup
34: first biasing spring
35: first magnet (retention auxiliary mechanism)
36: second magnet (retention auxiliary mechanism)
37: opening and closing actuation member
40: control apparatus
41: switching valve mechanism
42: casing
45: first pressure change chamber
47: second pressure change chamber
49: pressure-contacted portion
61: switching valve body
62: valve rod
63: valve gasket
63a: seal portion
68: bulging portion
70: toggle spring (first retention mechanism)
71: first actuator
72: float
76: opening actuation member
79: second actuator
80: switching cylinder
87: second fastened portion (regulating mechanism)
89: second fastening member (regulating mechanism)
92: second diaphragm
93: second reference pressure chamber
94: pressure detection chamber
95: switching piston cup
96: second biasing spring
97: first magnet (retention auxiliary mechanism)
98: second magnet (retention auxiliary mechanism)
99: closing actuation member
100A to 100C: air tube
111: reinforcing rib portion (high rigidity portion)
113: toggle member (first retention mechanism)
116: elastic retention portion
123: toggle spring (second retention mechanism)
124: retention member
126a to 126c: spring retention portion
127: check valve

BEST MODE FOR CARRYING OUT THE INVENTION

A description will be given below of embodiments according to the present invention with reference to the drawings.

First Embodiment

FIG. 1 shows a vacuum type sewage line system as one example of a vacuum water supply system to which a control apparatus 40 of a vacuum valve 10 according to the present invention is applied. The vacuum type sewage line system is provided with a water storage basin 1 which temporarily reserves waste water, and is structured such as to drain the waste water within the water storage basin 1 to a water collection tank on a downstream side with a vacuum suction action by a vacuum station.

The water storage basin 1 of the vacuum type sewage line system is formed in a closed-end tubular shape, and an upper end opening thereof is blocked by a lid body 2. A waste water reservoir 3 for reserving waste water is provided at the bottom of the water storage basin 1. Further, a natural falling pipe 4 in which an upstream side is in an atmospheric pressure state communicating with home sewage equipment (not illustrated) is connected to the water storage basin 1 above the waste water reservoir 3. Further, a vacuum water supply pipe 5 in which a downstream side is in a negative pressure (−25 to −70 kPa) state connected to the water collection tank of the vacuum station is connected to the water storage basin 1 so as to be positioned above the natural falling pipe 4. Further, an air intake pipe 6 which is opened to the ambient air is connected to the water storage basin 1 so as to be positioned further above the vacuum water supply pipe 5.

A gate valve 7, a water suction pipe 8, a vacuum valve 10, a water shut-off valve driving actuator 17, a control apparatus 40, and a float 72 are accommodated in the water storage basin 1. The water suction pipe 8 is connected to the vacuum water supply pipe 5 via the gate valve 7 and the vacuum valve 10. An opening in one end of the water suction pipe 8 is installed in such a manner as to be positioned above at predetermined distances (50 to 100 mm) from a bottom of the waste water reservoir 3. The gate valve 7 is closed by a manual operation at the time of newly constructing the vacuum type sewage line system or at the time of maintenance, and shuts off the communication between the vacuum valve 10 and the vacuum station via the vacuum water supply pipe 5. Further, the gate valve 7 is opened at the time of normal use after being newly constructed or after maintenance, and communicates the vacuum valve 10 with the vacuum station via the vacuum water supply pipe 5.

Next, a description will be given of a structure of the vacuum valve 10 which is controlled by the control apparatus 40 according to the present invention.

Figure 3:
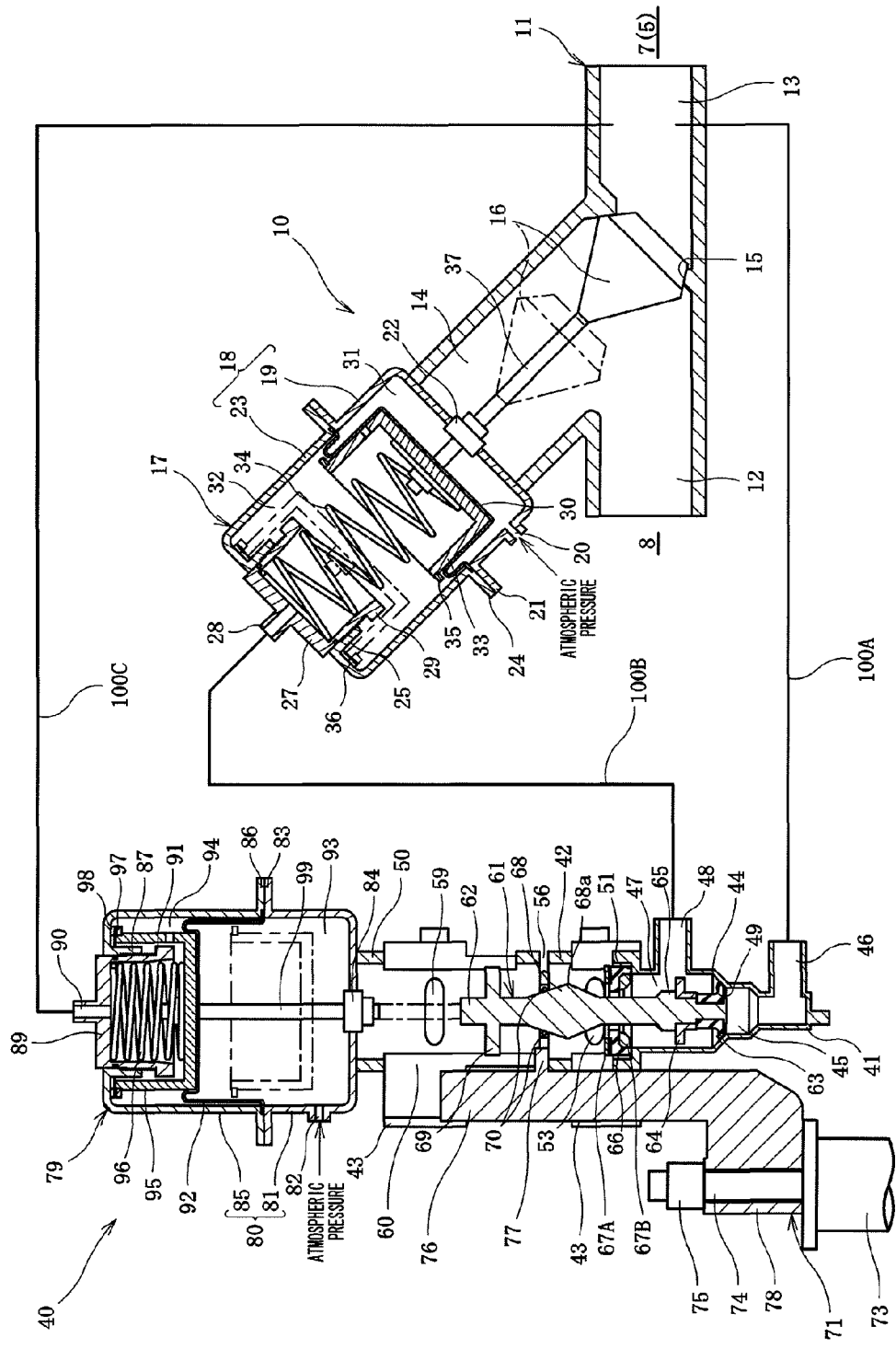
FIG. 3 is a cross sectional view showing a structure of a control apparatus of a vacuum valve according to the first embodiment.

As shown in FIG. 3, the vacuum valve 10 is provided with a pipe body 11 which is interposed between the gate valve 7 and the water suction pipe 8, a water shut-off valve body 16 which is arranged within the pipe body 11, and a water shut-off valve driving actuator 17 which drives the water shut-off valve body 16 so as to open and close.

The pipe body 11 is provided with a water suction port 12 to which the water suction pipe 8 is connected, a discharge port 13 to which the gate valve 7 is connected, and a valve body arrangement portion 14 in which the water shut-off valve body 16 is movably arranged. The water suction port 12 and the discharge port 13 are formed in a straight pipe shape. The valve body arrangement portion 14 is connected to a boundary portion between the water suction port 12 and the discharge port 13 so as to intersect at an acute angle, and is provided so as to extend to the water suction port 12. At an intersecting position of the water suction port 12, the discharge port 13, and the valve body arrangement portion 14, a circular valve port 15 is provided in an inner portion thereof by protruding a valve seat from an inner wall of the pipe body 11. The valve port 15 expands in an orthogonal direction with respect to an axis of the valve body arrangement portion 14, and a center thereof coincides with the axis of the valve body arrangement portion 14.

The water shut-off valve body 16 is arranged so as to be movable forward and backward along the axis of the valve body arrangement portion 14 by the water shut-off valve driving actuator 17. Opening and closing of the vacuum valve 10 is switched by the water shut-off valve body 16. If the water shut-off valve body 16 is moved forward by the water shut-off valve driving actuator 17, the water shut-off valve body 16 seats on a valve seat so as to block the valve port 15, and the vacuum valve 10 comes to a closed state. The valve closing of the vacuum valve 10 causes the communication between the water suction port 12 and the discharge port 13 to be shut off. At the time of the valve closing of the vacuum valve 10, the water suction port 12 and the valve body arrangement portion 14 come to the atmospheric pressure (ambient air open) state via the water suction pipe 8, and the discharge port 13 comes to the negative pressure state which is lower than the atmospheric pressure by the vacuum suction action of the vacuum station which is connected via the gate valve 7 and the vacuum water supply pipe 5. On the other hand, if the water shut-off valve body 16 is moved backward by the water shut-off valve driving actuator 17, the water shut-off valve body separates from the valve seat so as to open the valve port 15, and the vacuum valve 10 comes to the open state. The valve opening of the vacuum valve 10 causes the water suction port 12 and the discharge port 13 to be communicated. At the time of the valve opening of the vacuum valve 10, the water suction pipe 8, the water suction port 12, the valve body arrangement portion 14, and the discharge port 13 come to the negative pressure state which is lower than the atmospheric pressure by the vacuum suction action of the vacuum station which is connected via the gate valve 7 and the vacuum water supply pipe 5.

The water shut-off valve driving actuator 17 is structured such that an opening and closing actuation member 37 for actuating the water shut-off valve body 16 so as to open and close is arranged in a water shut-off cylinder 18 of which inner portion is partitioned into a pressure chamber 32 and a first reference pressure chamber 31. The water shut-off cylinder 18 is provided with a first lower case 19, a first upper case 23, a first diaphragm 30, a water shut-off piston cup 33, a first biasing spring 34, and a first retention auxiliary mechanism.

The first lower case 19 is attached in such a manner as to seal an open end of the valve body arrangement portion 14 of the pipe body 11. The first lower case 19 is provided with a first air vent hole 20 for sucking the ambient air. Further, an open end of the first lower case 19 is provided with a coupling flange 21 which protrudes outward. Further, a first insertion member 22 inserting the opening and closing actuation member 37 thereto is arranged in a blocked portion which is positioned at an opposite side of the opening of the first lower case 19 in such a manner as to be positioned at the axis of the valve body arrangement portion 14.

The first upper case 23 has, at its open end, a coupling flange 24 which is coupled to the coupling flange 21 of the first lower case 19 in a sealed state. The blocked portion positioned at the opposite side of the opening of the first upper case 23 is provided with a regulating mechanism for regulating a biasing force of a first biasing spring 34 which biases the opening and closing actuation member 37 in a advanced direction. The regulating mechanism includes a first fastened portion 25 which is provided in the blocked portion, and a first fastening member 27 which can be fastened to the first fastened portion 25. The first fastened portion 25 is provided with a cylinder portion which protrudes inward in an edge of an opening portion provided in the axis of the first upper case 23, and is structured such that a thread groove is provided in an inner periphery thereof. In this case, a predetermined region in an open end side of the first fastened portion 25 is formed as a seal region with which a seal member is brought into pressure contact without provision of a thread groove. The first fastening member 27 is formed in a cylindrical shape which is a separate body from the first upper case 23 which is open in one end. The first fastening member 27 has, in its blocked portion, a connection portion 28 which is connected to a switching valve mechanism 41 mentioned later. Further, the first fastening member 27 is provided in an outer peripheral portion positioned at a side opposite to the connection portion 28 with a thread portion which engages with the thread groove of the first fastened portion 25, and is structured such as to be assembled to the first fastened portion 25 by being fastened from an inner portion side of the first upper case 23. Further, a seal member which is brought into pressure contact with the seal region of the first fastened portion 25 in an assembled state is arranged in the first fastening member 27. Further, for preventing the first fastening member 27 from slipping out of the first fastened portion 25 due to an excess rotating operation, a first stopper portion 29 which is in contact with a protruding end portion of the first fastened portion 25 is provided in the first fastening member 27 in a manner protruding outward in a diametrical direction.

The first diaphragm 30 is made of a flexible material which partitions the inner portion of the water shut-off cylinder 18 into a first reference pressure chamber 31 which is positioned at a side of the valve body arrangement portion 14, and a pressure chamber 32 which is positioned at a side away from the valve body arrangement portion 14. The first diaphragm 30 is integrally assembled in a state in which an outer peripheral portion is sandwiched between the coupling flanges 21 and 24 of the first lower case 19 and the first upper case 23. In this case, a reference pressure within the first reference pressure chamber 31 according to the present embodiment is set to the atmospheric pressure by the first air vent hole 20 which is formed in the first lower case 19.

The water shut-off piston cup 33 is formed in a saucer shape in which an inner diameter is larger than an outer diameter of the first fastening member 27. The water shut-off piston cup 33 is arranged so that its closed bottom is firmly fixed to the first diaphragm 30, in such a manner as to be positioned within the pressure chamber 32 of the water shut-off cylinder 18. The water shut-off piston cup 33 is provided with an air vent hole for preventing the pressure chamber 32 from being partitioned in a retreated state of the water shut-off piston cup 33.

The first biasing spring 34 is arranged between the first fastening member 27 and the water shut-off piston cup 33. The first biasing spring 34 biases the water shut-off valve body 16 toward a closed position via the water shut-off piston cup 33 and the opening and closing actuation member 37. Further, if a pressure within the pressure chamber 32 becomes equal to or more than a first degree of vacuum P1 which is lower than the atmospheric pressure, the first biasing spring 34 expands and contracts via the water shut-off piston cup 33 due to a pressure difference with respect to the pressure within the first reference pressure chamber 31. Specifically, if the degree of vacuum within the pressure chamber 32 becomes higher (a first degree of vacuum P1'), the first biasing spring 34 starts to gradually contract by a pressing force generated by a movement (rearward movement) of the water shut-off piston cup 33. Further, if the degree of vacuum within the pressure chamber 32 becomes equal to or more than the first degree of vacuum P1, the first biasing spring 34 comes to a completely contracted state. On the other hand, if the degree of vacuum within the pressure chamber 32 becomes lower than the first degree of vacuum P1, the first biasing spring 34 gradually expands against a pressing force (vacuum suction force) toward the retreated direction of the water shut-off piston cup 33. Further, if the degree of vacuum within the pressure chamber 32 becomes lower than the first degree of vacuum P1', the first biasing spring 34 comes to a completely expanded state.

The first retention auxiliary mechanism is structured such as to auxiliary retain the retreated state by retaining the water shut-off piston cup 33 with the retaining force weaker than the biasing force of the first biasing spring 34, in a state in which the first biasing spring 34 is contracted via the water shut-off piston cup 33. The first retention auxiliary mechanism includes a first magnet 35 which is arranged in an open end outer peripheral portion of the water shut-off piston cup 33, and a second magnet 36 which is provided at a position corresponding to the first magnet 35 in an axial direction of the first upper case 23. In the water shut-off cylinder 18 provided with the first retention auxiliary mechanism, if the pressure chamber 32 becomes equal to or more than the first degree of vacuum P1, the water shut-off piston cup 33 moves to the retreated position while contracting the first biasing spring 34 as mentioned above. Accordingly, the magnets 35 and 36 are attracted by mutual magnet forces. As a result, the water shut-off piston cup 33 is retained in the state of being moved to the retreated position, due to the vacuum suction force within the pressure chamber 32 and the attracting force by the magnets 35 and 36. In the retreated state of the water shut-off piston cup 33, if the degree of vacuum within the pressure chamber 32 becomes higher than the first degree of vacuum P1, the biasing force of the first biasing spring 34 becomes larger than the vacuum suction force within the pressure chamber 32, however, the retreated state of the water shut-off piston cup 33 is maintained by the attracting force of the magnets 35 and 36. Further, if the degree of vacuum within the pressure chamber 32 becomes lower than a fourth degree of vacuum P4 which is lower than the first degree of vacuum P1 (P1>P4), the biasing force of the first biasing spring 34 becomes larger than a retention force obtained by adding the vacuum suction force within the pressure chamber 32 and the attracting force by the magnets 35 and 36. As a result, the first biasing spring 34 expands against the pressing force toward the retreating direction of the water shut-off piston cup 33, and moves the water shut-off piston cup 33 forward.

The opening and closing actuation member 37 includes a rod which is connected to a bottom center of the water shut-off piston cup 33. The opening and closing actuation member 37 is inserted through the first insertion member 22 of the first lower case 19, and extends along the axis of the valve body arrangement portion 14. Further, the water shut-off valve body 16 is integrally firmly fixed to a leading end thereof. In this case, the opening and closing actuation member 37 may be integrally provided in a state of being connected to the water shut-off piston cup 33 so as to be connected to the water shut-off valve body 16, or may be integrally provided in the water shut-off valve body 16 so as to be integrally connected to the water shut-off piston cup 33.

Next, a description will be given of an outline structure of the control apparatus 40 of the vacuum valve 10 according to the first embodiment of the present invention.

Figure 2:
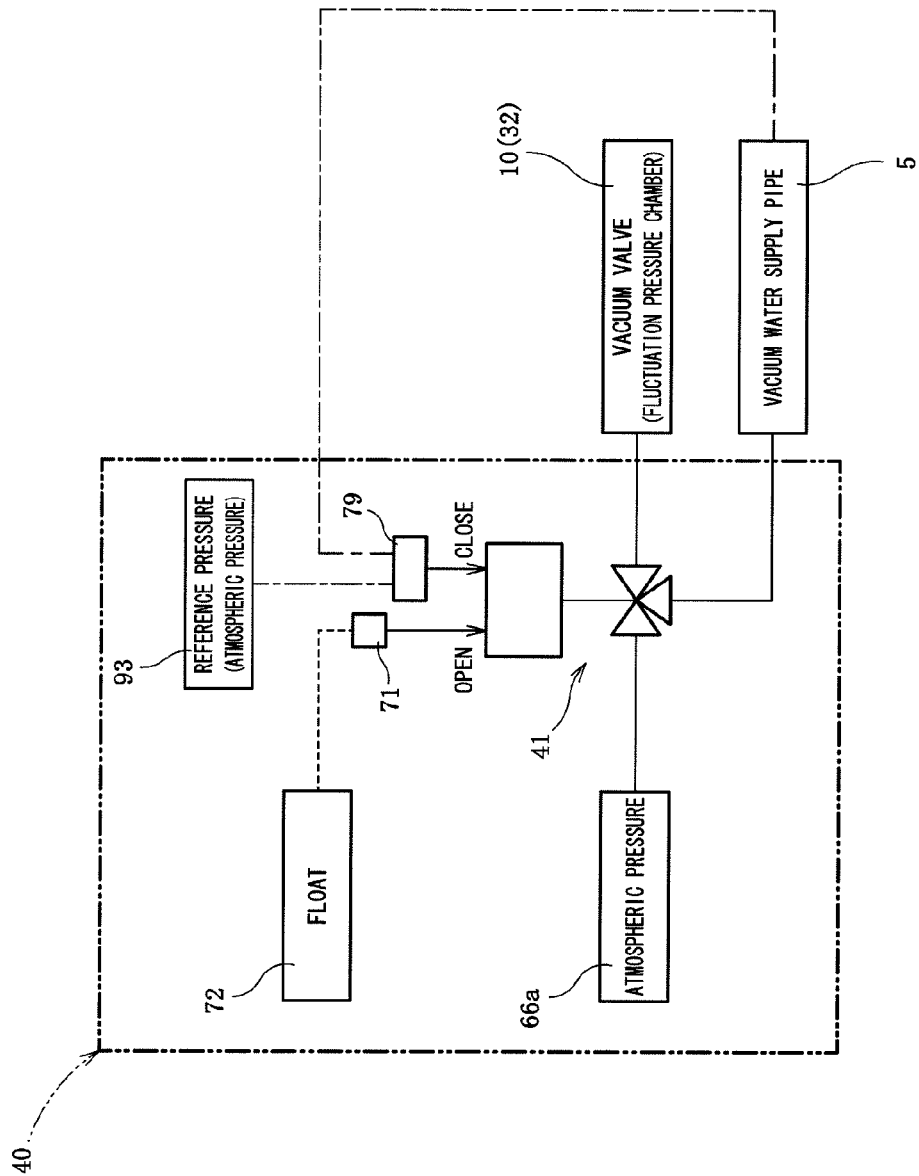
FIG. 2 is a conceptual view of a control apparatus according to a first embodiment.

As shown in FIG. 2, the control apparatus 40 according to the present embodiment is provided with the switching valve mechanism 41 of a three-way valve structure. The switching valve mechanism 41 is actuated so as to open by a first (opening actuation) actuator 71 which works with ascent and descent of the float 72. Further, if the switching valve mechanism 41 is actuated to an open position, the vacuum water supply pipe 5 and the pressure chamber 32 of the vacuum valve 10 are communicated with each other, and the vacuum valve 10 is set to the valve open state. Further, the switching valve mechanism 41 is actuated so as to close by a second (closing actuation) actuator 79 which is actuated by a pressure difference between the reference pressure and the pressure within the vacuum water supply pipe 5. Further, if the switching valve mechanism 41 is actuated to the closed position, the pressure chamber 32 is opened to the ambient air as well as shutting off the communication between the vacuum water supply pipe 5 and the pressure chamber 32 of the vacuum valve 10. Accordingly, the pressure chamber 32 is made to become lower than the first degree of vacuum P1 (fourth degree of vacuum P4) actuating the valve to close, and the vacuum valve 10 is set to the valve closed state.

Next, a description will be specifically given of the control apparatus 40 of the vacuum valve 10 according to the present invention.

Figure 4:
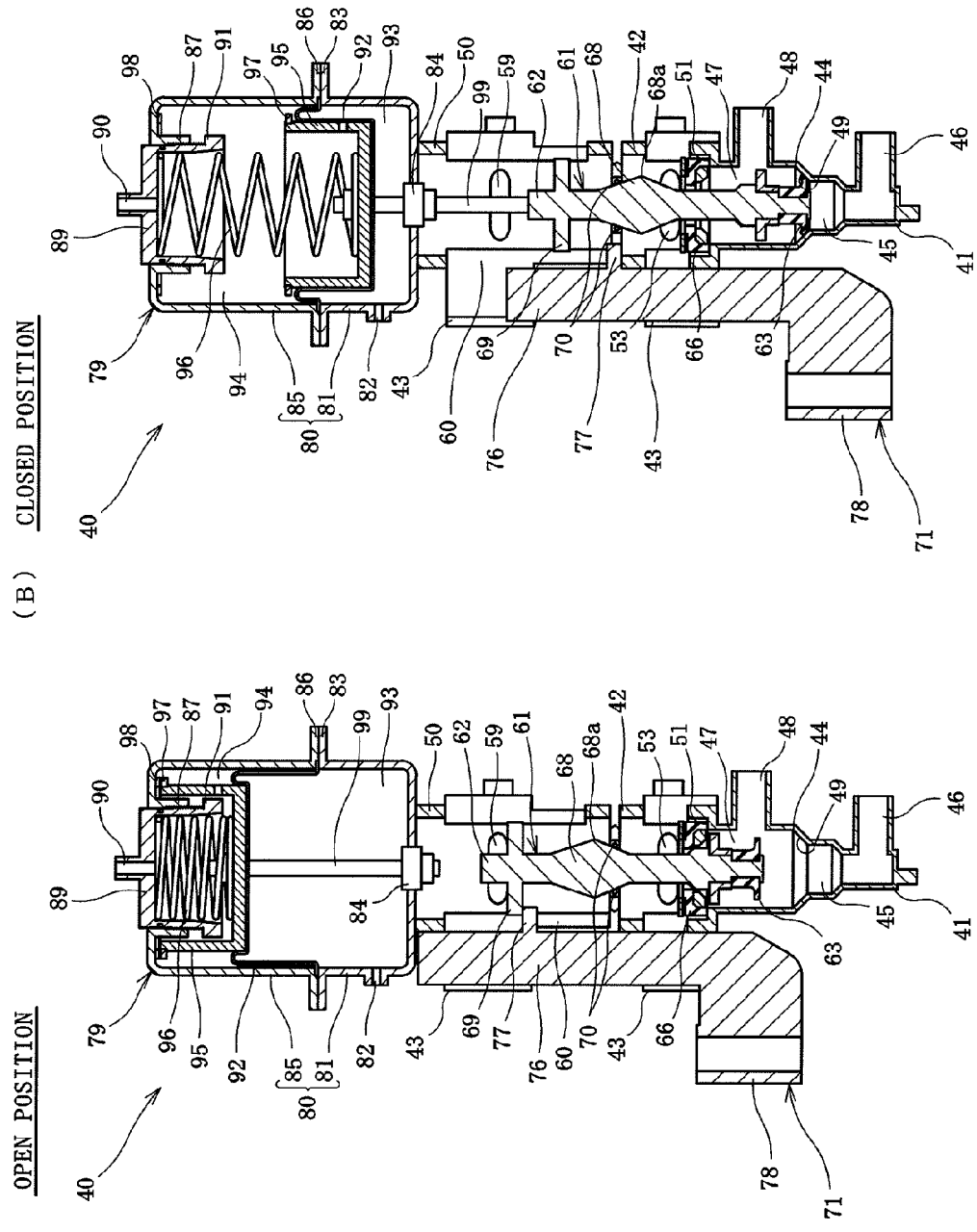
FIGS. 4(A) and 4(B) are cross sectional views showing an actuation state of the control apparatus.

As shown in FIG. 3 and FIGS. 4(A) and 4(B), the control apparatus 40 is provided with the switching valve mechanism 41 having one switching valve body 61, the first actuator 71 for actuating the switching valve body 61 so as to open, and the second actuator 79 for actuating the switching valve body 61 so as to close. By the switching of the switching valve body 61, the degree of vacuum within the pressure chamber 32 of the vacuum valve 10 is switched, and the vacuum valve 10 is actuated so as to open and close.

Figure 5:
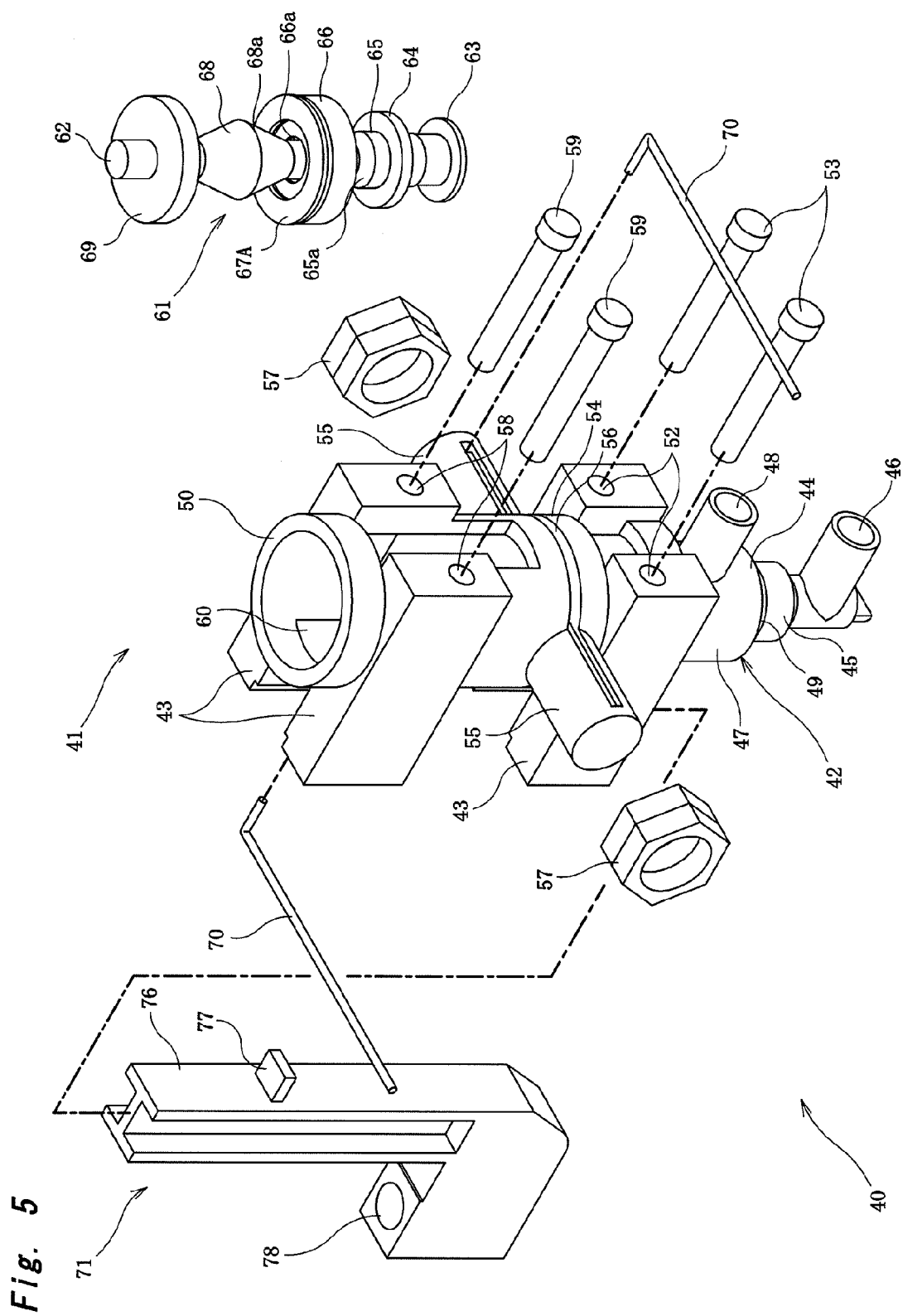
FIG. 5 is an exploded perspective view of a switching valve mechanism of the control apparatus and a first actuator.

As shown in FIG. 3 and FIG. 5, the switching valve mechanism 41 is provided with the casing 42, the switching valve body 61 which is arranged in an inner portion of the casing 42 so as to be linearly movable, and a first retention mechanism which retains the switching valve body 61 at the open position and the closed position.

The casing 42 is provided with a vacuum valve connection portion 44 in a lower portion in which an outer shape is formed in an approximately inverted conical tubular shape, and an actuator connection portion 50 in an upper portion in which an outer shape is formed in an approximately cylindrical shape. The casing 42 is provided with four fixing arm portions 43 in parallel in two upper and lower stages. A bracket member (not illustrated) is fixed by screwing to a left side in FIG. 3 of the fixing arm portion 43. The control apparatus 40 is fixed to a predetermined position within the water storage basin 1 via the bracket member.

In an inner portion of the vacuum valve connection portion 44, there are formed a first pressure change chamber 45 which is communicated with the discharge port 13 of the vacuum valve 10, and a second pressure change chamber 47 which is communicated with the pressure chamber 32 of the vacuum valve 10. The first pressure change chamber 45 is positioned at a lower end, and in its outer peripheral portion, a first connection portion 46 which is connected to the discharge port 13 of the vacuum valve 10 is provided in a manner protruding outward in a diametrical direction. The second pressure change chamber 47 is positioned at an upper portion along an axial direction of the first pressure change chamber 45, and is structured such that an inner diameter is larger than the first pressure change chamber 45. In the second pressure change chamber 47, a second connection portion 48 which is connected to the pressure chamber 32 of the vacuum valve 10 is provided in a manner protruding outward in a diametrical direction. A pressure-contacted portion 49 with which the switching valve body 61 is brought into pressure contact is provided between the pressure change chambers 45 and 47.

The pressure-contacted portion 49 is formed in an inverted conical tubular shape in which an inner diameter gradually becomes large upward.

The actuator connection portion 50 is formed in a cylindrical shape which extends upward with a larger inner diameter than the second pressure change chamber 47 corresponding to an upper portion of the vacuum valve connection portion 44. Accordingly, a sealing pressure contact step portion 51 is formed in a boundary portion between the vacuum valve connection portion 44 and the actuator connection portion 50. A pair of first insertion holes 52 and 52 is provided above the pressure contact step portion 51 (refer to FIG. 5). In the present embodiment, the first insertion holes 52 and 52 are provided in the fixing arm portion 43 in the lower stage. The first insertion hole 52 is structured such that a part thereof is communicated with an internal space of the actuator connection portion 50. A locking member 53 is inserted to each of the first insertion holes 52, and the first insertion hole 52 is structured such as to inhibit an upward movement of a seal member 66 mentioned later, by protruding a part of the locking member 53 to an internal space. In FIG. 3, a portion protruding to the internal space of the actuator connection portion 50 of the locking member 53 is shown as a transverse ellipse.

An upper portion of the first insertion hole 52 is provided with an arrangement portion 54 of a toggle spring 70 which forms the first retention mechanism. The toggle member arrangement portion 54 is provided with a pair of thread shaft portions 55 and 55 which protrude outward, and a spring arrangement groove 56 which extends over the thread shaft portions 55 and 55. The thread shaft portions 55 and 55 are provided in a protruding manner in such a manner as to extend in an orthogonal direction with respect to the fixing arm portion 43. A portion between the thread shaft portions 55 and 55 of the spring arrangement groove 56 is communicated with the internal space of the actuator connection portion 50. By fastening a nut 57 to the thread shaft portions 55 and 55 in a state in which the toggle spring 70 is arranged in the spring arrangement groove 56, the toggle spring 70 is assembled so as not to fall away.

A pair of second insertion holes 58 and 58 is provided above the toggle member arrangement portion 54, and a stopper member 59 for stopping an upward movement of the switching valve body 61 is inserted to each of the second insertion holes 58 and 58. The second insertion hole 58 and the stopper member 59 have the same structure as the first insertion hole 52 and the locking member 53.

Further, in the actuator connection portion 50, an insertion groove 60 which extends up and down along the axial direction and communicates with (penetrates into) an internal space is provided between the fixing arm portions 43 and 43 adjacent to each other in a transverse direction.

The switching valve body 61 is structured such that a valve gasket 63 is arranged at a lower end of a valve rod 62 which extends to the actuator connection portion 50 from the vacuum valve connection portion 44. The valve rod 62 is linearly moved upward by the first actuator 71, whereby the valve gasket 63 is moved to an open position (refer to FIG. 4(A)) which communicates the first and second pressure change chambers 45 and 47 of the casing 42. Further, the valve rod 62 is linearly moved downward by the second actuator 79, thereby being brought into pressure contact with the pressure-contacted portion 49 and being moved to a closed position (refer to FIG. 4(B)) which shuts off the communication between the first and second pressure change chambers 45 and 47 of the casing 42.

A guide member 64 as a separate body is installed above of the valve gasket 63 in the valve rod 62. An upper portion of the guide member 64 is provided with a stopper portion 65 which positions an upper side of the guide member 64. The stopper portion 65 has a pressure contact portion 65a which protrudes so as to form a conical shape in its upper portion. In the valve rod 62, a seal member 66 brought into pressure contact with the pressure contact step portion 51 from the above is installed above the stopper portion 65 so as to be movable along the axial direction.

The seal member 66 is structured such as to switch the second pressure change chamber 47 and the actuator connection portion 50 which is opened to the ambient air by the insertion groove 60 to a communicated open state and a blocked state in which the communication is shut off, by the movement of the switching valve body 61. The seal member 66 is provided with a through hole 66a which has a larger diameter than a diameter of the valve rod 62. The through hole 66a is blocked by the pressure contact portion 65a when the switching valve body 61 is moved to the open position. Accordingly, in the second pressure change chamber 47 of the vacuum valve connection portion 44, the communication with the actuator connection portion 50 via the through hole 66a is shut off. Further, the through hole 66a is opened by the separation of the pressure contact portion 65a when the switching valve body 61 is moved to the closed position. Accordingly, the second pressure change chamber 47 of the vacuum valve connection portion 44 is set to the ambient air open state which is communicated with the actuator connection portion 50 through the through hole 66a. Reinforcing members 67A and 67B are arranged above and below the seal member 66. The reinforcing members 67A and 67B are formed in an annular shape having a larger through hole than the through hole 66a. In this case, the upper portion of the upper reinforcing member 67A is locked to the locking member 53, whereby the seal member 66 is arranged immovably in the pressure contact step portion 51 in a pressure contact state.

The valve rod 62 is provided above the seal member 66 with a bulging portion 68 having a rhomboid cross sectional shape which is contracted in such a manner that a diameter becomes gradually smaller after being extended in such a manner that the diameter becomes gradually larger. A passive flange portion 69 protruding outward in a diametrical direction is provided above the bulging portion 68.

The first retention mechanism is configured by a pair of L-shaped toggle springs 70 and 70 which is arranged in the spring arrangement groove 56, and a bulging portion 68 of the valve rod 62. The toggle springs 70 and 70 are positioned partly within the actuator connection portion 50 in an assembled state. In this assembled state, a distance between the toggle springs 70 and 70 is structured such as to be larger than a diameter of the valve rod 62, and smaller than a diameter of a most bulged ridge portion 68a of the bulging portion 68. By making the bulging portion 68 interfere with the toggle spring 70 in this manner, the state in which the switching valve body 61 is moved to the open position and the closed position is retained by a predetermined retention force.

The first actuator 71 is structured such as to move the switching valve body 61 from the closed position to the open position against the retention force of the toggle spring 70 if the waste water is reserved up to a previously set first water level HWL within the water storage basin 1. The first actuator 71 is provided with the float 72 which moves up and down in correspondence to the water level within the water storage basin 1, and an opening actuation member 76 which moves along a linear moving direction of the switching valve body 61 in conjunction with the ascent and descent of the float 72.

Buoyancy Fb of the float 72 is larger than a retention force Fs of the toggle springs 70 and 70 (Fs<Fb). The float 72 is integrally provided with a connecting rod 73 for connecting to the opening actuation member 76. An upper end of the connecting rod 73 is provided with an insertion shaft portion 74 in which an outer diameter is reduced. The insertion shaft portion 74 is a thread shaft, and is fixed to the opening actuation member 76 by fastening a nut 75. In this case, the connecting rod 73 is set to an entire length which can actuate so as to open the switching valve body 61 via the opening actuation member 76 in a state in which the waste water is reserved up to the previously set first water level HWL within the water storage basin 1. Further, a distance obtained by adding a stroke S1 which is necessary for actuating the switching valve body 61 so as to open, and a depth S2 at which the float 72 is dipped into the waste water is set smaller than a distance between the first water level HWL and the second water level LWL which actuate the switching valve body 61 so as to open and close. Accordingly, the float 72 is structured such as to be positioned above the water surface of the waste water in a state in which the waste water of the water storage basin 1 is lowered to the second water level LWL.

The opening actuation member 76 has an H-shaped cross sectional shape, and is structured such as to be attached between the fixing arm portions 43 and 43 so as to extend along the axial direction of the casing 42 which is the linear moving direction of the switching valve body 61. The opening actuation member 76 is provided with an actuation portion 77 which protrudes into the actuator connection portion 50 while passing through the insertion groove 60 of the casing 42 and is positioned at a lower portion of the passive flange portion 69 of the switching valve body 61. Further, a lower end of the opening actuation member 76 is provided with an installation portion 78 which installs the connecting rod 73 of the float 72 and protrudes outward. The installation portion 78 has a hole having a diameter which is larger than the insertion shaft portion 74 of the connecting rod 73 and smaller than the nut 75. By arranging the bracket member in the fixing arm portion 43, the opening actuation member 76 is installed to the casing 42 so as not to fall away.

The second actuator 79 is structured such as to move the switching valve body 61 from the open position to the closed position against the retention force of the toggle spring 70 if the waste water within the water storage basin 1 is drained to the lower side (the second water level LWL) than the lower end of the water suction pipe 8. The second actuator 79 according to the present embodiment has the same structure as the water shut-off valve driving actuator 17 of the vacuum valve 10. Specifically, the second actuator 79 is structured such that a closing actuation member 99 for actuating the switching valve body 61 so as to close is arranged in the switching cylinder 80, which inner portion is partitioned into a pressure detection chamber 94 and a second reference pressure chamber 93. Further, the switching cylinder 80 is provided with a second lower case 81, a second upper case 85, a second diaphragm 92, a switching piston cup 95, a second biasing spring 96, and a second retention auxiliary mechanism.

The second lower case 81 is integrally attached to an upper end of the actuator connection portion 50 of the casing 42. In the same manner as the first lower case 19, the second lower case 81 is provided with a second air vent hole 82 for sucking the ambient air, a coupling flange 83 for coupling the second upper case 85, and a second insertion member 84 inserting the closing actuation member 99.

In the same manner as the first upper case 23, the second upper case 85 is provided with a coupling flange 86 for coupling to the second lower case 81, and a regulating mechanism for regulating a biasing force of a second biasing spring 96 biasing the closing actuation member 99 in a closing direction. The regulating mechanism includes a second fastened portion 87 provided in a blocked portion, and a second fastening member 89 which can be fastened to the second fastened portion 87. The second fastened portion 87 is provided with a cylinder portion in which a thread grove is provided in an inner periphery. The second fastening member 89 has, in an outer peripheral portion, a thread portion which engages with the thread groove. The second fastening member 89 is provided with a third connection portion 90 which is connected to the discharge port 13 of the vacuum valve 10, and a second stopper portion 91 which comes into contact with a protruding end portion of the second fastened portion 87.

The second diaphragm 92 is made of a flexible material which partitions an inner portion of the switching cylinder 80 into a second reference pressure chamber 93 positioned at a side of the actuator connection portion 50, and a pressure detection chamber 94 positioned at a side away from the actuator connection portion 50. A reference pressure within the second reference pressure chamber 93 is set to the atmospheric pressure by a second air vent hole 82 which is formed in the second lower case 81.

The switching piston cup 95 is arranged by being firmly fixed to the second diaphragm 92 so as to be positioned within the pressure detection chamber 94 of the switching cylinder 80. The switching piston cup 95 is provided with an air vent hole for preventing the pressure detection chamber 94 from being partitioned.

The second biasing spring 96 is arranged between the second fastening member 89 and the switching piston cup 95. The second biasing spring 96 biases the switching valve body 61 toward the closed position via the switching piston cup 95 and the closing actuation member 99. Further, if the pressure within the pressure detection chamber 94 becomes equal to or less than the second degree of vacuum P2 that is lower than the atmospheric pressure, the second biasing spring 96 expands and contracts via the switching piston cup 95 due to a pressure difference with respect to the pressure within the second reference pressure chamber 93. Specifically, if the degree of vacuum within the pressure detection chamber 94 becomes higher (second degree of vacuum P2'), the second biasing spring 96 gradually starts to contract by the pressing force caused by the movement of the switching piston cup 95. Further, if the degree of vacuum within the pressure detection chamber 94 becomes equal to or more than the second degree of vacuum P2, the second biasing spring 96 comes to a completely contracted state. On the other hand, if the degree of vacuum within the pressure detection chamber 94 becomes lower than the second degree of vacuum P2, the second biasing spring 96 gradually expands against a pressing force of the switching piston cup 95. Further, if the degree of vacuum within the pressure detection chamber 94 becomes lower than the second degree of vacuum P2', the second biasing spring 96 comes to a completely expanded state.

In the present embodiment, the biasing force of the second biasing spring 96, that is, a force Fc moving the switching valve body 61 to the closed position is set larger than the buoyancy Fb of the float 72 (Fs<Fb<Fc). Accordingly, in the case where the opening actuation by the first actuator 71 and the closing actuation by the second actuator 79 are simultaneously carried out on the switching valve body 61, the closing actuation by the second actuator 79 is executed.

The second retention auxiliary mechanism is structured such as to retain the switching piston cup 95 by the retaining force weaker than the biasing force of the second biasing spring 96, in a state in which the second biasing spring 96 is contracted via the switching piston cup 95. The second retention auxiliary mechanism includes a first magnet 97 which is arranged in an open end outer peripheral portion of the switching piston cup 95, and a second magnet 98 which is provided at a position corresponding to the axial direction of the first magnet 97 and the second upper case 85. The second actuator 79 provided with the second retention auxiliary mechanism is structured such that if the switching piston cup 95 moves to a retreated position by contracting the second biasing spring 96, the magnets 97 and 98 are attracted to each other by mutual magnetic forces. As a result, it is possible to retain the switching piston cup 95 by the vacuum suction force within the pressure detection chamber 94 and the attracting force by the magnets 97 and 98. Further, if the degree of vacuum within the pressure detection chamber 94 becomes further lower than the third degree of vacuum P3 which is lower than the second degree of vacuum P2, the biasing force of the second biasing spring 96 becomes larger than the retention force obtained by adding the vacuum suction force within the pressure detection chamber 94 and the attracting force by the magnets 97 and 98, thereby the switching piston cup 95 is advanced.

Since the present embodiment has the same structure as the water shut-off valve driving actuator 17, the biasing force of the second biasing spring 96 is the same as the biasing force of the first biasing spring 34. Accordingly, the third degree of vacuum P3 by which the second actuator 79 is actuated so as to open and close is basically identical to the fourth degree of vacuum P4 by which the water shut-off valve driving actuator 17 is actuated so as to open and close. Accordingly, in the water shut-off valve driving actuator 17 and the second actuator 79, the third degree of vacuum P3 actuating the switching valve body 61 so as to close is set higher than the fourth degree of vacuum P4 actuating the water shut-off valve body 16 so as to close (P3>P4) by the regulation of the fastening members 27 and 89. Accordingly, if the degree of vacuum within the discharge port 13 becomes lower, the switching valve body 61 is actuated so as to close prior to the water shut-off valve body 16. Along with this, the first degree of vacuum P1 actuating the water shut-off valve body 16 so as to open is set lower than the second degree of vacuum P2 actuating the switching valve body 61 so as to open (P1<P2).

The closing actuation member 99 is configured by a rod which is connected to a bottom center of the switching piston cup 95. The closing actuation member 99 coincides with the valve rod 62 of the switching valve body 61 and moves linearly along a linear moving direction of the switching valve body 61 by passing through the second insertion member 84 of the second lower case 81 and extending along the axis of the actuator connection portion 50. The closing actuation member 99 is set to such an entire length that the ridge portion 68a of the bulging portion 68 can be lowered to a position below the toggle spring 70, in a state in which the switching piston cup 95 is advanced to a critical position shown by a single dot chain line in FIG. 3. In this case, the closing actuation member 99 of the second actuator 79 may be integrally provided in a state of being connected to the switching piston cup 95.

When the control apparatus 40 having the above structure is applied to the vacuum type sewage line system, the control apparatus 40 is fixed into the water storage basin 1 via the bracket member such that the float 72 is positioned at the waste water reservoir 3 of the water storage basin 1. Further, the first connection portion 46 of the control apparatus 40 and the discharge port 13 of the vacuum valve 10 are connected by an air tube 100A that is a connecting piping. Further, the second connection portion 48 of the control apparatus 40 and the connection portion 28 of the vacuum valve 10 are connected by an air tube 100B. Further, the third connection portion 90 of the control apparatus 40 and the discharge port 13 of the vacuum valve 10 are connected by an air tube 100C. In this case, the present embodiment is structured such as to be connected to the vacuum water supply pipe 5 via the discharge port 13 by connecting the first connection portion 46 of the control apparatus 40 to the discharge port 13; however, the air tube 100A may be directly connected to the vacuum water supply pipe 5.

Next, a description will be given of a motion of the vacuum type sewage line system to which the control apparatus 40 is applied.

Figure 6A:
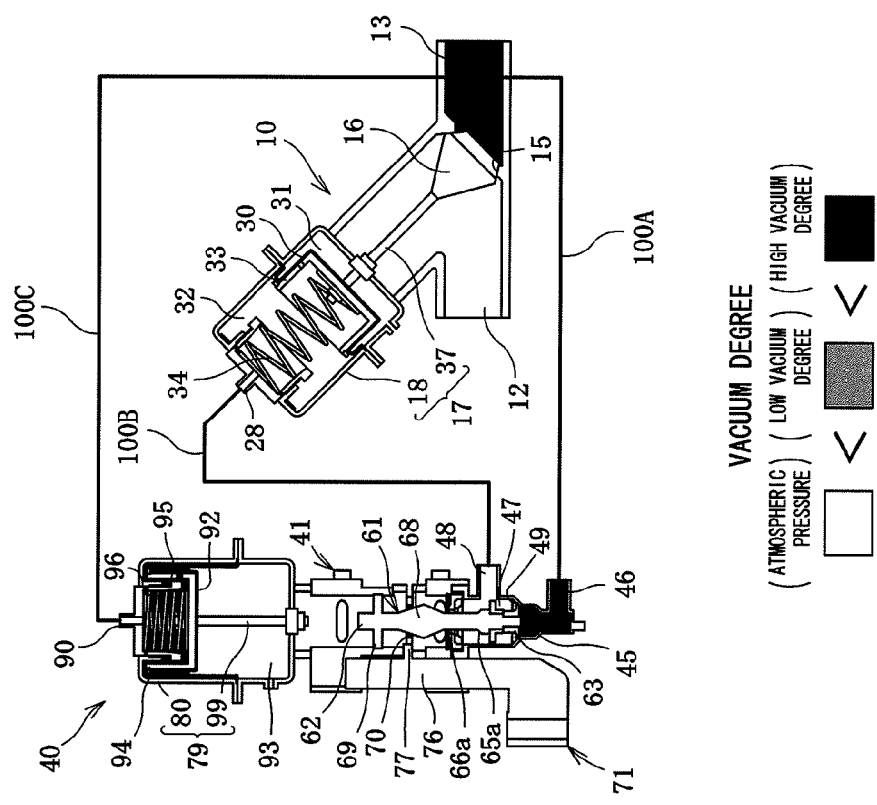
FIG. 6A is a schematic view showing a non-actuated state of the control apparatus.

As shown in FIG. 6A, in a state where the waste water in the water storage basin 1 is reserved only below the water suction pipe 8, the switching valve body 61 of the control apparatus 40 is moved to the closed position, and this state is retained by the retention force of the toggle springs 70 and 70. Further, the vacuum valve 10 comes to the valve closed state in which the water shut-off valve body 16 is moved to the closed position.

In this state, the water suction port 12 of the vacuum valve 10 comes to a state of the atmospheric pressure which is opened to the ambient air via the water suction pipe 8. The discharge port 13 of the vacuum valve 10 comes to a state which is equal to or more than the first degree of vacuum P1 that is lower than the atmospheric pressure by the suction action of the vacuum station. Accordingly, the first pressure change chamber 45 of the switching valve mechanism 41 of the control apparatus 40 comes to a state which is equal to or more than the first degree of vacuum P1 by the communication with the discharge port 13. Further, the pressure detection chamber 94 of the second actuator 79 of the control apparatus 40 comes to a state which is equal to or more than the second degree of vacuum P2 that is lower than the atmospheric pressure by the communication with the discharge port 13. As a result, the closing actuation member 99 comes to a retreated state via the switching piston cup 95. On the other hand, the communication between the second pressure change chamber 47 of the switching valve mechanism 41 of the control apparatus 40 and the first pressure change chamber 45 is shut off by the switching valve body 61, and comes to the ambient air open state through the through hole 66a of the seal member 66 and the insertion groove 60. Accordingly, the pressure chamber 32 of the vacuum valve 10 comes to the ambient air open state via the second pressure changer chamber 47.

Further, if the waste water is reserved within the water storage basin 1, the float 72 lands on the water so as to rise, and if the float 72 rises to the first water level HWL, the opening actuation member 76 is moved upward. As a result, the switching valve body 61 moves upward to the open position while elastically extending the toggle spring 70 against the retention force of the toggle spring 70. Further, if the ridge portion 68a of the bulging portion 68 gets over the toggle spring 70, the toggle spring 70 is elastically restored, thereby retaining the switching valve body 61 at the open position.

If the switching valve body 61 actuates so as to open as mentioned above, the first pressure change chamber 45 of the control apparatus 40 is communicated with the second pressure change chamber 47, thereby blocking the through hole 66a of the seal member 66 by the pressure contact portion 65a of the switching valve body 61, as shown in FIG. 6B. As a result, the second pressure change chamber 47 of the control apparatus 40 is shut off from the ambient air, and is vacuum-sucked via the first pressure change chamber 45 and the discharge port 13, thereby becoming equal to or more than the first degree of vacuum P1. Along with this, the pressure chamber 32 of the vacuum valve 10 comes to a degree of vacuum which is equal to or more than the first degree of vacuum P1 in the same manner. Accordingly, in the vacuum valve 10, the water shut-off valve driving actuator 17 is actuated so as to open as shown in FIG. 6C. As a result, the vacuum valve 10 comes to the valve open state in which the water shut-off valve body 16 is moved to the open position, and the water suction port 12 and the discharge port 13 are communicated. Accordingly, the waste water within the water storage basin 1 is drained (fed) via the water suction pipe 8, the pipe body 11 of the vacuum valve 10, the gate valve 7, and the vacuum water supply pipe 5 by the suction action of the vacuum station.

Figure 6D:
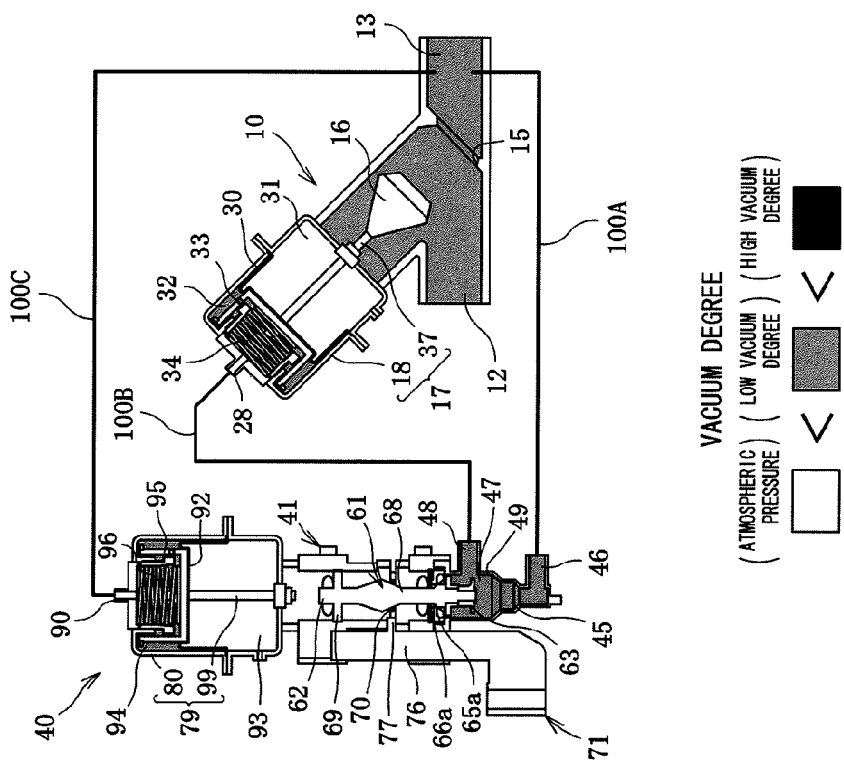
FIG. 6D is a schematic view showing a state in which air is mixed by drainage and a degree of vacuum is lowered.

If the waste water within the water storage basin 1 is lowered close to the lower end of the water suction pipe 8 by draining, the air is mixed into the sucked water from the water suction pipe 8. Accordingly, as shown in FIG. 6D, the degree of vacuum within the discharge port 13 becomes lower than the second degree of vacuum P2. Along with this, the degree of vacuum within the pressure detection chamber 94 of the second actuator 79 of the control apparatus 40 communicating with the discharge port 13 becomes lower than the second degree of vacuum P2. Further, the degree of vacuum within the pressure chamber 32 of the vacuum valve 10 communicating with the discharge port 13 via the first pressure change chamber 45 and the second pressure change chamber 47 becomes lower than the first degree of vacuum P1. However, in this state, the retention force retaining the water shut-off piston cup 33 at the retreated position, and the retention force retaining the switching piston cup 95 at the retreated position are larger than the biasing force of the biasing springs 34 and 96 due to the attracting force of the magnets 35, 36, 97, and 98. Accordingly, the water shut-off valve body 16 of the vacuum valve 10 and the switching valve body 61 of the control apparatus 40 maintain the open position.

Figure 6E:
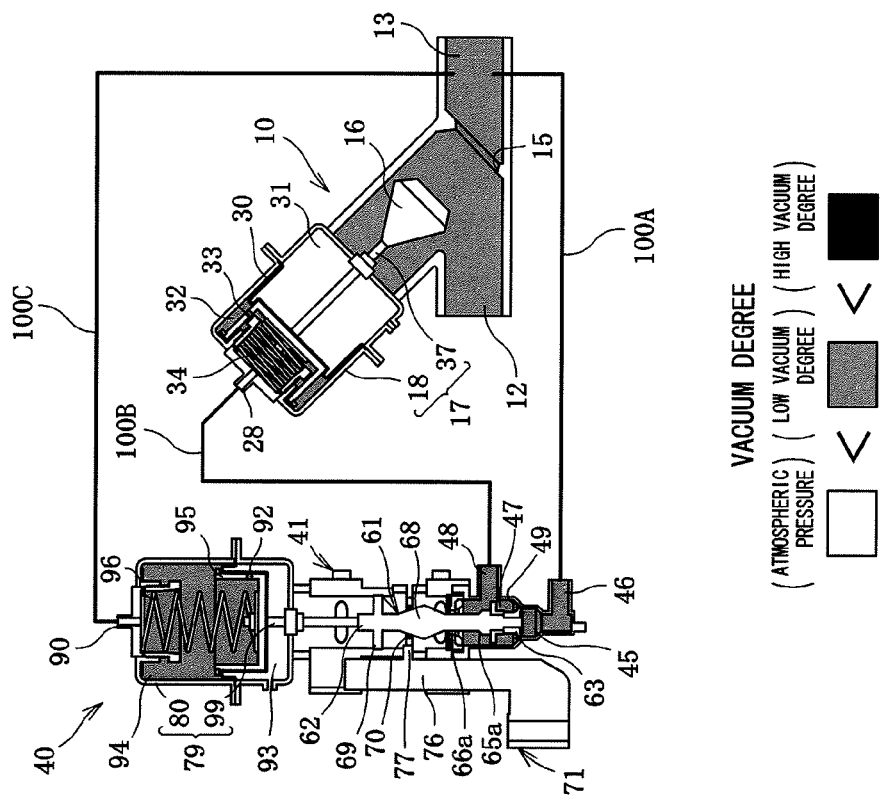
FIG. 6E is a schematic view showing a state in which the switching valve body is actuated so as to close according to FIG. 6D.

Further, if the waste water within the water storage basin 1 is drained to the second water level LWL and a mixing amount of air is increased, the degree of vacuum within the discharge port 13 of the vacuum valve 10 becomes lower than the third degree of vacuum P3. Accordingly, the biasing force of the second biasing spring 96 becomes larger than the retention force retaining the switching piston cup 95 at the retreated position. As a result, as shown in FIG. 6E, the switching valve body 61 of the control apparatus 40 is moved to the closed position against the retention force of the toggle spring 70. On the other hand, the water shut-off valve driving actuator 17 according to the present embodiment sets the degree of vacuum actuating the water shut-off valve body 16 so as to close to the fourth degree of vacuum P4 that is lower than the third degree of vacuum P3. Accordingly, in the vacuum valve 10, the water shut-off valve body 16 maintains the open position and maintains the valve open state.

Figure 6G:
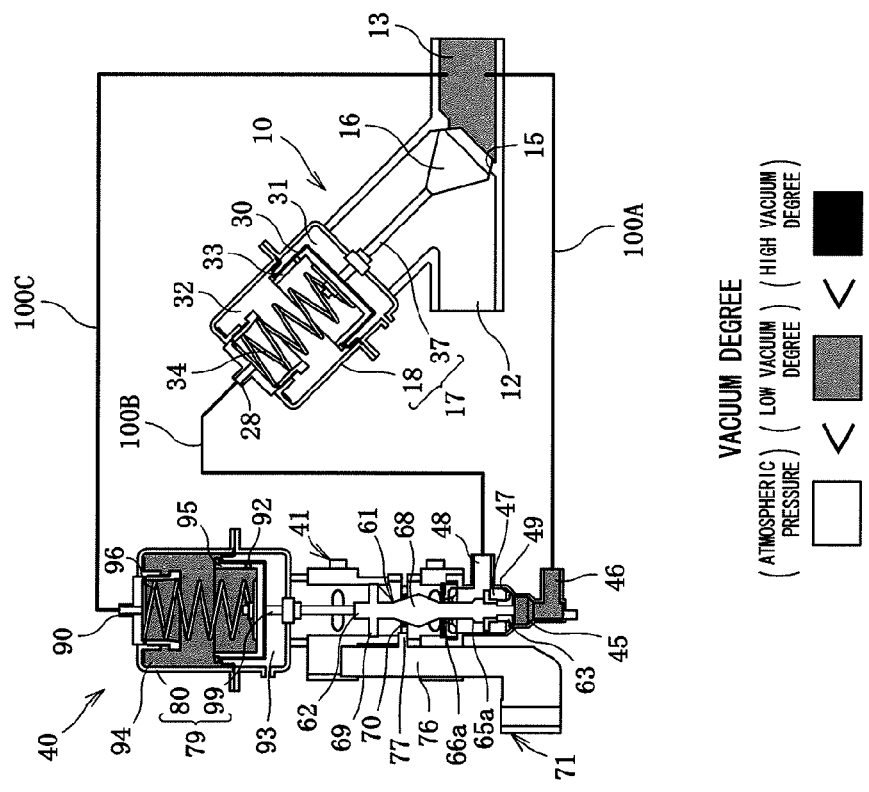
FIG. 6G is a schematic view showing a state in which the water shut-off valve body is actuated so as to close according to FIG. 6F.

Accordingly, as shown in FIG. 6F, the communication between the second pressure change chamber 47 of the control apparatus 40 and the first pressure change chamber 45 is shut off, and the second pressure change chamber 47 comes to the ambient air open state through the through hole 66a of the seal member 66. Accordingly, the degree of vacuum within the pressure chamber 32 of the vacuum valve 10 communicating with the second pressure change chamber 47 comes to the atmospheric pressure state that is lower than the fourth degree of vacuum P4. As a result, the biasing force of the first biasing spring 34 becomes larger than the retention force retaining the water shut-off piston cup 33 at the retreated position. Accordingly, as shown in FIG. 6G, in the vacuum valve 10, the water shut-off valve body 16 is moved to the closed position and comes to the valve closed state.

Accordingly, the drainage from the water suction port 12 of the vacuum valve 10 via the discharge port 13 is stopped. Further, by shutting off the valve port 15, the degree of vacuum of the discharge port 13 becomes equal to or more than the first degree of vacuum P1 as shown in FIG. 6H. As a result, the first pressure change chamber 45 of the switching valve mechanism 41 constituting the control apparatus 40 and the pressure detection chamber 94 of the second actuator 79 become equal to or more than the actuation degrees of vacuum P1 and P2, respectively. Therefore, the second actuator 79 moves to the retreated position, and comes to a state shown in FIG. 6A.

As mentioned above, the control apparatus 40 according to the present invention is structured such that the pressure chamber 32 of the vacuum valve 10 is connected only to the second pressure change chamber 47 of the switching valve mechanism 41. Further, the second pressure change chamber 47 of the switching valve mechanism 41 is structured such as to be communicated with the first pressure change chamber 45 which communicates with the discharge port 13 of the vacuum valve 10. Further, the first and second pressure change chambers 45 and 47 are switched to the communicated open position and the blocked closed position by actuating one switching valve body 61 so as to open by the first actuator 71 and actuating so as to close by the second actuator 79. Further, the switching valve body 61 is retained at the open position or the closed position by the toggle spring 70 when the actuators 71 and 79 are not actuated. Further, the degree of vacuum P3 which the second actuator 71 actuates so as to close is set higher than the degree of vacuum P4 which the vacuum valve 10 actuates so as to close. Accordingly, in the valve open state of the vacuum valve 10 in which the switching valve body 61 is moved to the open position and the water shut-off valve body 16 is moved to the open position, the degree of vacuum within the pressure chamber 32 of the vacuum valve 10 does not become lower than the fourth degree of vacuum P4 which the vacuum valve 10 actuates so as to close, by the structure other than the switching valve mechanism 41. As a result, it is not necessary to arrange the part such as the check valve or the like.

Further, the first and second actuators 71 and 79 are structured such as to be integrally attached to the switching valve mechanism 41. Accordingly, since the control apparatus 40 is configured only by a single component, it is extremely simple. Further, since the air tubes 100A to 100C which are necessary for piping for actuating in accordance with the degree of vacuum within the vacuum water supply pipe 5 are only three which connects the first pressure change chamber 45 and the second pressure change chamber 47 of the switching valve mechanism 41, and the pressure detection chamber 94 of the second actuator 79, it is possible to simplify the structure of the piping. As a result, it is possible to achieve a downsizing and a cost reduction of the system on which the control apparatus 40 is mounted.

Further, in the present embodiment, the first actuator 71 utilizing the float 72 carries out only the opening actuation of the switching valve body 61. Accordingly, it is not necessary to detect the water level of the water storage basin 1 after actuating the switching valve body 61 so as to open. In other words, it is sufficient if the float 72 can detect only an extremely small range for detecting the first water level HWL under such a condition that the waste water is reserved within the water storage basin 1. Accordingly, by securing the strength of the bracket member for installing the control apparatus 40, the opening actuation member 76 of the first actuator 71, and the like, the float 72 can maintain a state above the water surface of the waste water, that is, a state of floating in the air and not coming into contact with the waste water under a state in which the amount of the waste water within the water storage basin 1 is small. Accordingly, since it is possible to greatly reduce the amount of scum floating near the water surface of the waste water being attached to the float 72, it is possible to prevent the malfunction generated by inhibiting the up and down motion of the float 72. Further, since it is possible to make the range of the up and down motion of the float 72 small, it is possible to prevent an abrasion caused by a sliding motion and a malfunction therewith. As a result, it is possible to stably actuate the float 72 over the long term. Further, even if the earth and sand mixed into the waste water flowing into the water storage basin 1 during the use is accumulated on the bottom of the water storage basin 1, or a remaining material at the time of construction unexpectedly flows in, the floating motion of the float 72 is hardly affected. Therefore, it is possible to obtain a malfunction preventing effect.

Further, the second actuator 79 for actuating the water shut-off valve body 16 via the switching valve body 61 so as to close is actuated by detecting that the water level is lowered below the lower end of the water suction pipe 8 by the pressure difference between the pressure within the pressure detection chamber 94 and the pressure within the second reference pressure chamber 93. Accordingly, the position of the lower end of the water suction pipe 8 can be set close to the bottom of the water storage basin 1, and most of the scum mixing into the waste water can be drained to the outer portion of the water storage basin 1 from the water suction pipe 8. Therefore, the unit on which the vacuum valve 10 and the control apparatus 40 are mounted does not require a periodical maintenance for removing the accumulated scum.

Further, in the control apparatus 40 according to the present invention, the force Fc for moving the switching valve body 61 to the closed position by the second actuator 79 is set larger than the buoyancy Fb of the float 72 (Fb<Fc). Accordingly, in the case where the opening actuation by the first actuator 71 and the closing actuation by the second actuator 79 are simultaneously carried out to the switching valve body 61, the closing actuation by the second actuator 79 is executed. As a result, it is possible to prevent occurrence of chattering in which the vacuum valve 10 repeats the valve open state and the valve closed state.

Specifically, in a situation where the waste water within the water storage basin 1 has risen to the first water level HWL and the first actuator 71 executes the opening actuation, the second actuator 79 cannot execute the closing actuation under a normal usage environment. Further, a situation where the first actuator 71 executes the opening actuation in a situation where the second actuator 79 executes the closing actuation is a state in which the float 72 is firmly fixed to the water storage basin 1 by the scum or the like and cannot be lowered. The firm fixation of the float 72 by the scum or the like hardly occurs as mentioned above. However, in the case where such a situation occurs by any possibility, the firmly fixing force Fa of the float 72 by the scum or the like is normally weaker than the buoyancy Fb of the float 72 (Fa<Fb). Further, in the present embodiment, the force Fc for moving the switching valve body 61 to the closed position by the second actuator 79 is set larger than the buoyancy Fb of the float 72 (Fa<Fb<Fc). As a result, in the case where the float 72 is firmly fixed under the normal usage environment, it is possible to release the firm fixation by the closing actuation of the second actuator 79. Accordingly, it is possible to reliably prevent occurrence of the chattering under the normal usage environment.

Further, in the present embodiment, in the second actuator 79 of the control apparatus 40, there are arranged the magnets 97 and 98 which retain the state in which the switching piston cup 95 is retreated, with the weaker force than the biasing force of the second biasing spring 96. Further, if the degree of vacuum within the pressure detection chamber 94 becomes lower than the third degree of vacuum P3 which is lower than the second degree of vacuum P2, the switching valve body 61 is structured such as to be actuated to close via the closing actuation member 99 by the biasing force of the second biasing spring 96. Accordingly, it is possible to set the force Fc moving the switching valve body 61 to the closed position by the second actuator 79 so as to become certainly larger than the buoyancy Fb of the float 72.

Further, in the second actuator 79 of the control apparatus 40, the second fastening member 89 is arranged in the switching cylinder 80, whereby it is possible to regulate the biasing force of the second biasing spring 96. Accordingly, it is possible to set so as to reliably actuate the closing actuation member 99 in accordance with the condition of the degree of vacuum which differs by the installed environment such as the distance to the vacuum station or the like.

Further, the present embodiment is structured to employ the same structure in the water shut-off valve driving actuator 17 for actuating the water shut-off valve body 16 of the vacuum valve 10 so as to open and close, and the second actuator 79 for actuating the switching valve body 61 of the control apparatus 40 so as to close. Accordingly, it is possible to reduce the number of the parts which are necessary for constructing the system mounted with the control apparatus 40, and it is possible to achieve a cost reduction.

Second Embodiment

Figure 7:
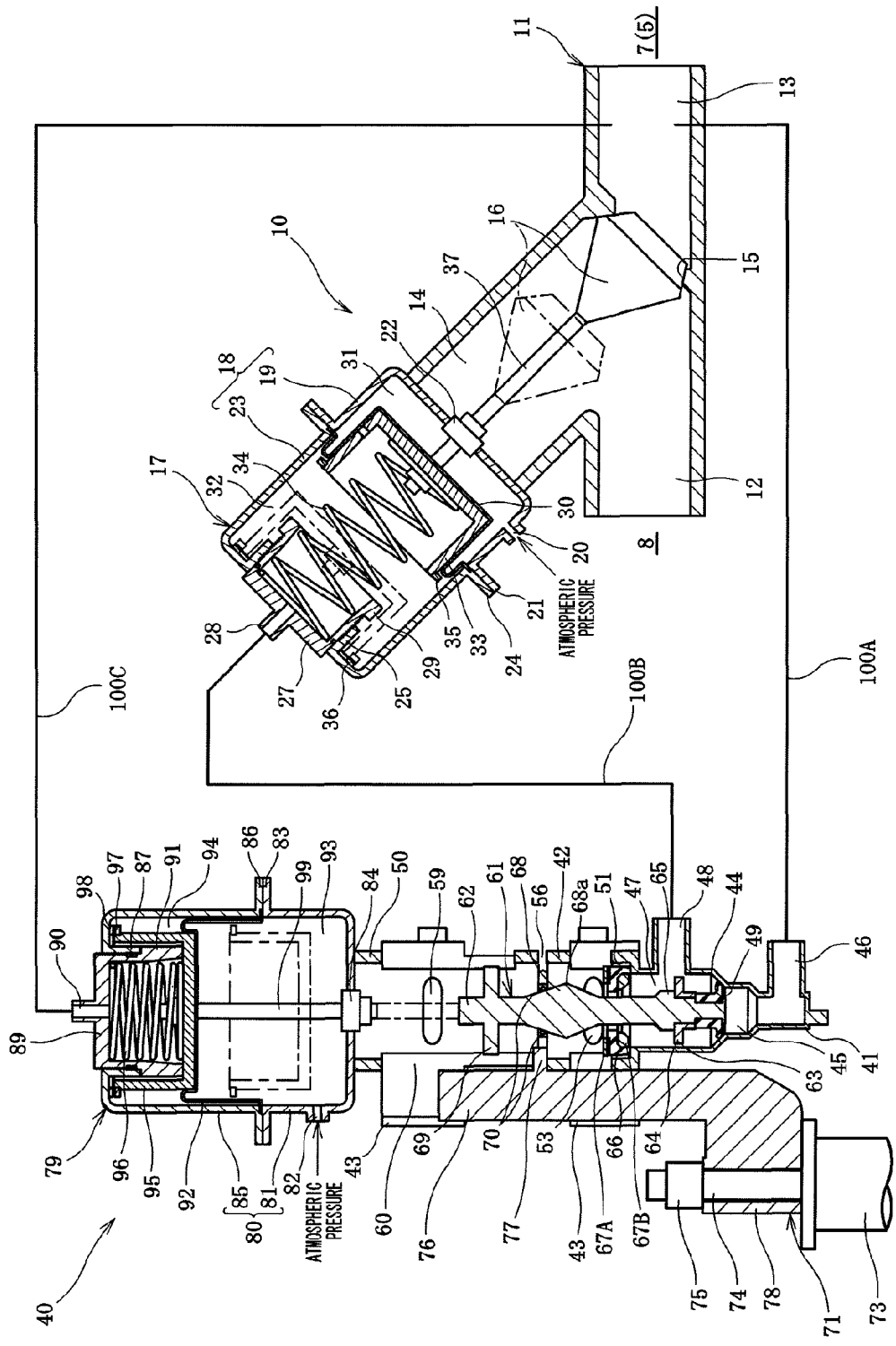
FIG. 7 is a cross sectional view showing a structure of a control apparatus of a vacuum valve according to a second embodiment.

FIG. 7 shows a control apparatus 40 according to a second embodiment. The control apparatus 40 is different from the first embodiment in that the retention force by the retention auxiliary mechanism is regulated, instead of regulating the biasing force of the second biasing spring 96 by the regulating mechanism.

Specifically, in the second embodiment, a second fastened portion 87 is provided in the second upper case 85 of the second actuator 79, and the second fastening member 89 is attached to the second fastened portion 87 so as to be capable of fastening. In an outer periphery of the second fastening member 89, a thread portion is provided in the third connection portion 90 side. Further, the switching piston cup 95 comes into contact with the second fastening member 89 at the retreated position.

The second embodiment structured as mentioned above can move the second fastening member 89 only in a direction of fastening from the illustrated state. Accordingly, in the switching piston cup 95, the distance between the magnets 97 and 98 is regulated in accordance with a fastening amount of the second fastening member 89. As a result, it is possible to regulate the auxiliary retention force of the switching piston cup 95 by the magnets 97 and 98.

Third Embodiment

FIG. 8 to FIG. 15 show a control apparatus 40 according to a third embodiment. The control apparatus 40 is different from each of the embodiments in that the setting of the second degree of vacuum P2 by which the second actuator 79 is actuated so as to close is made easy, that the second degree of vacuum P2 can be set lower than the first degree of vacuum P1 by which the vacuum valve 10 is actuated so as to close, and that a useful life of the valve gasket 63 of the switching valve body 61 can be set to a long term. In the control apparatus 40 according to the present embodiment, the magnets 35 and 36 constituting the retention auxiliary mechanism are not necessary in the vacuum valve 10.

The control apparatus 40 according to the third embodiment is provided with the switching valve mechanism 41 having one switching valve body 61, the first actuator 71 actuating the switching valve body 61 so as to open, and the second actuator 79 actuating the switching valve body 61 so as to close.

Figure 8:
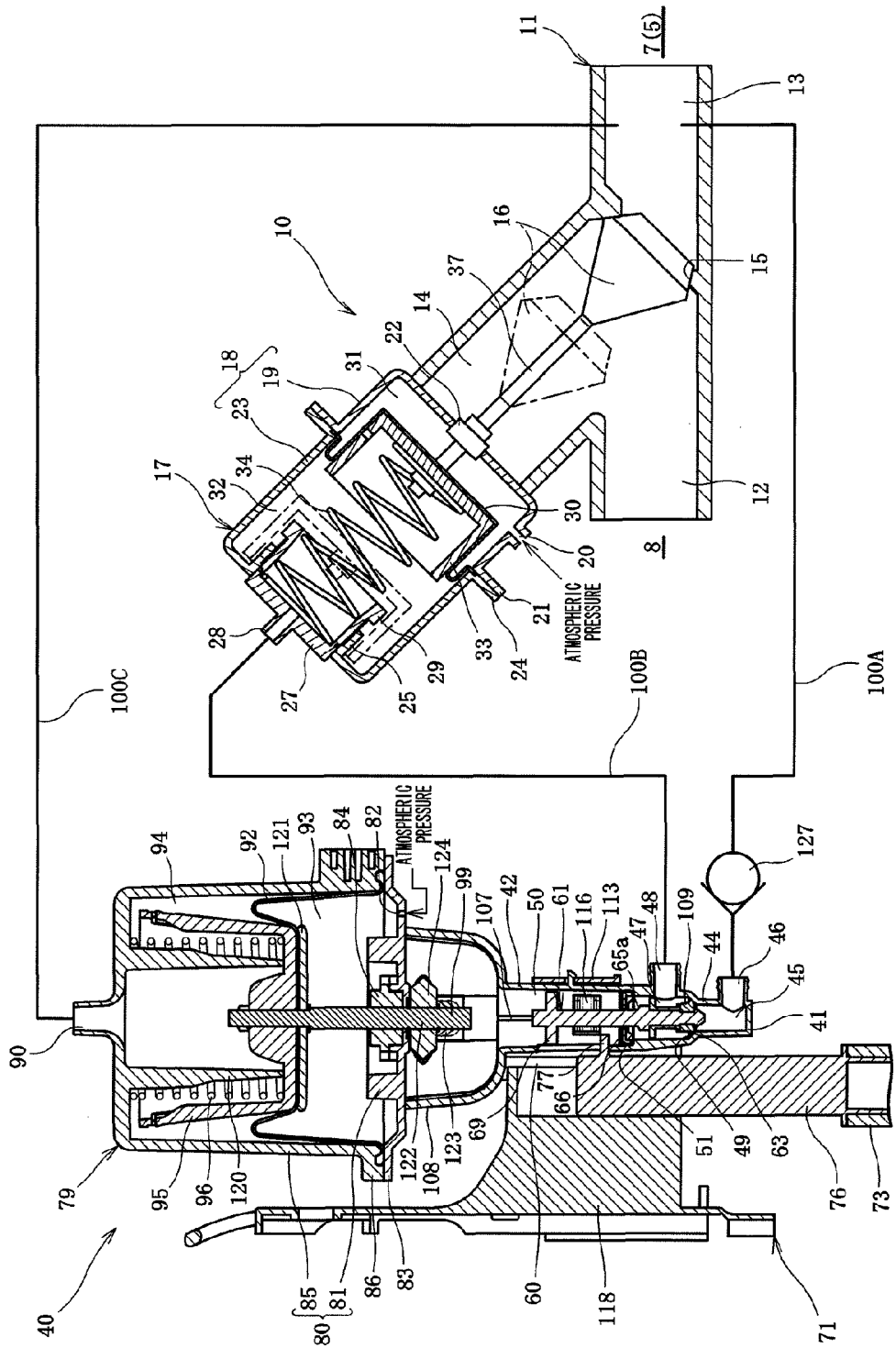
FIG. 8 is a cross sectional view showing a structure of a control apparatus of a vacuum valve according to a third embodiment.
Figure 9:
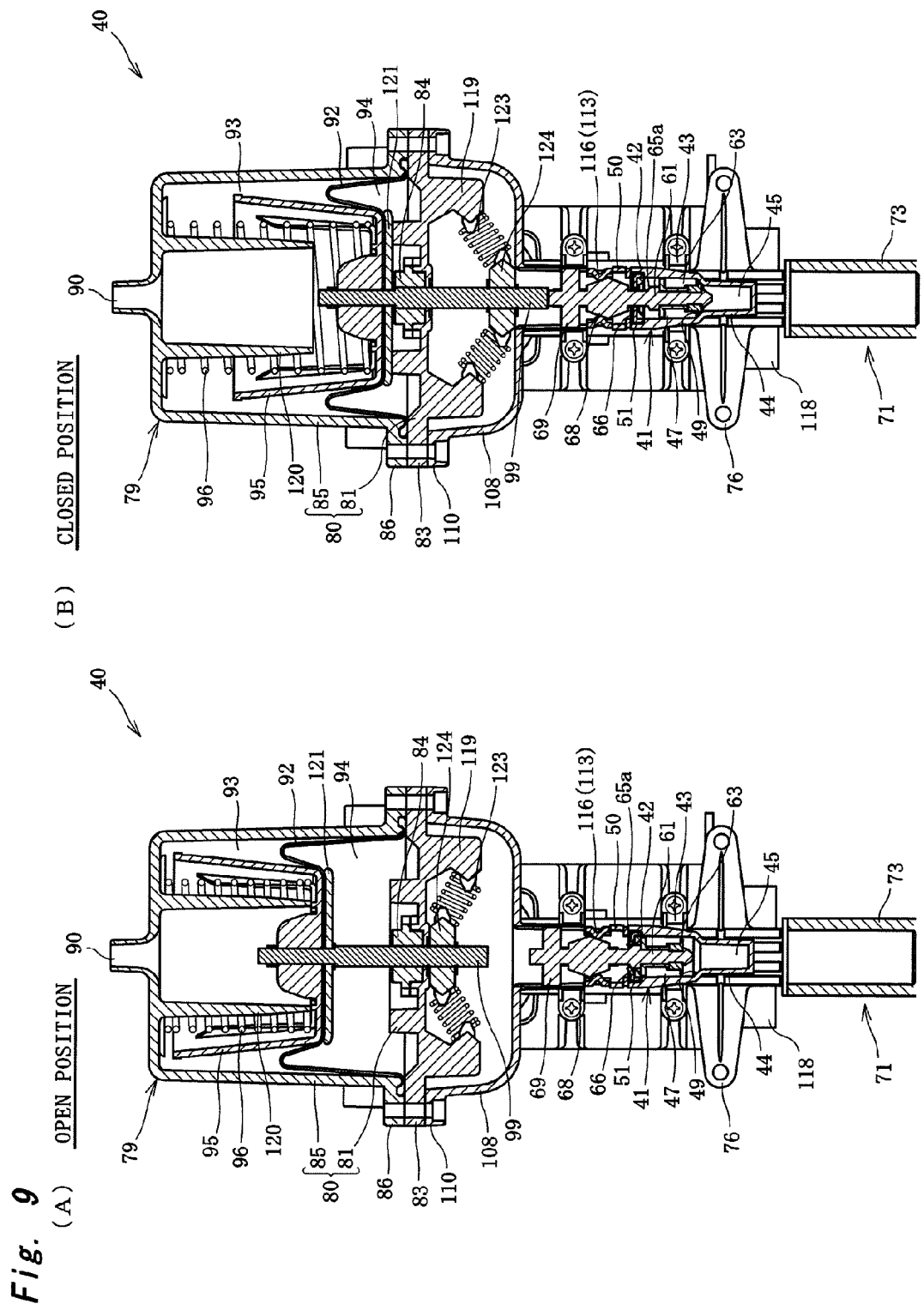
FIGS. 9(A) and 9(B) are cross sectional views showing an actuated state of the control apparatus according to the third embodiment.
Figure 10:
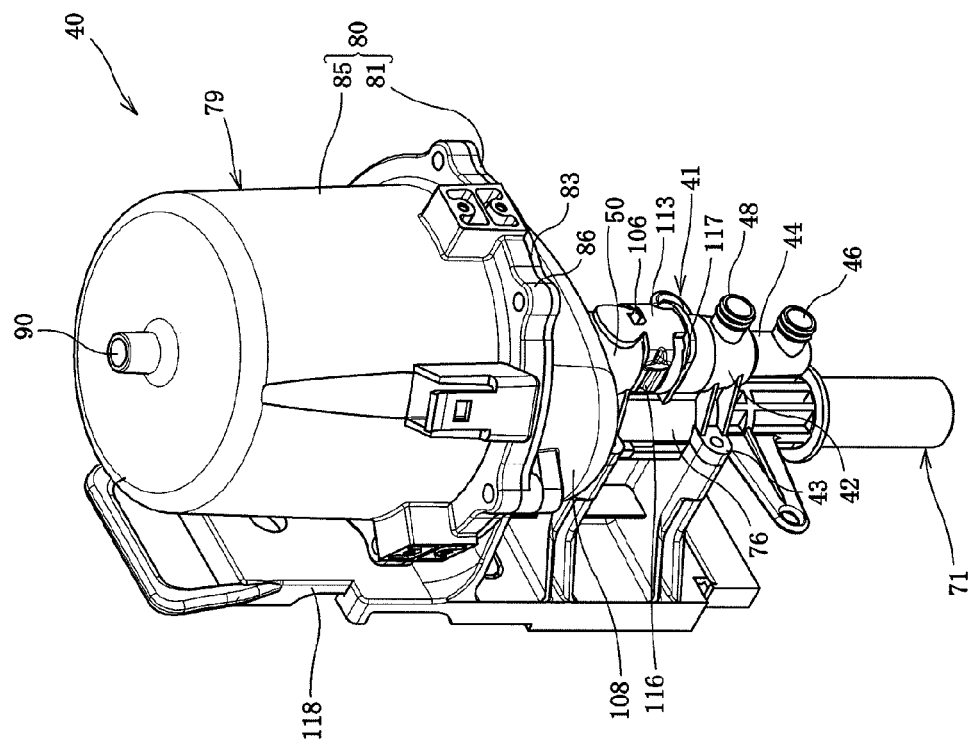
FIG. 10 is an upward perspective view showing the control apparatus according to the third embodiment.
Figure 11:
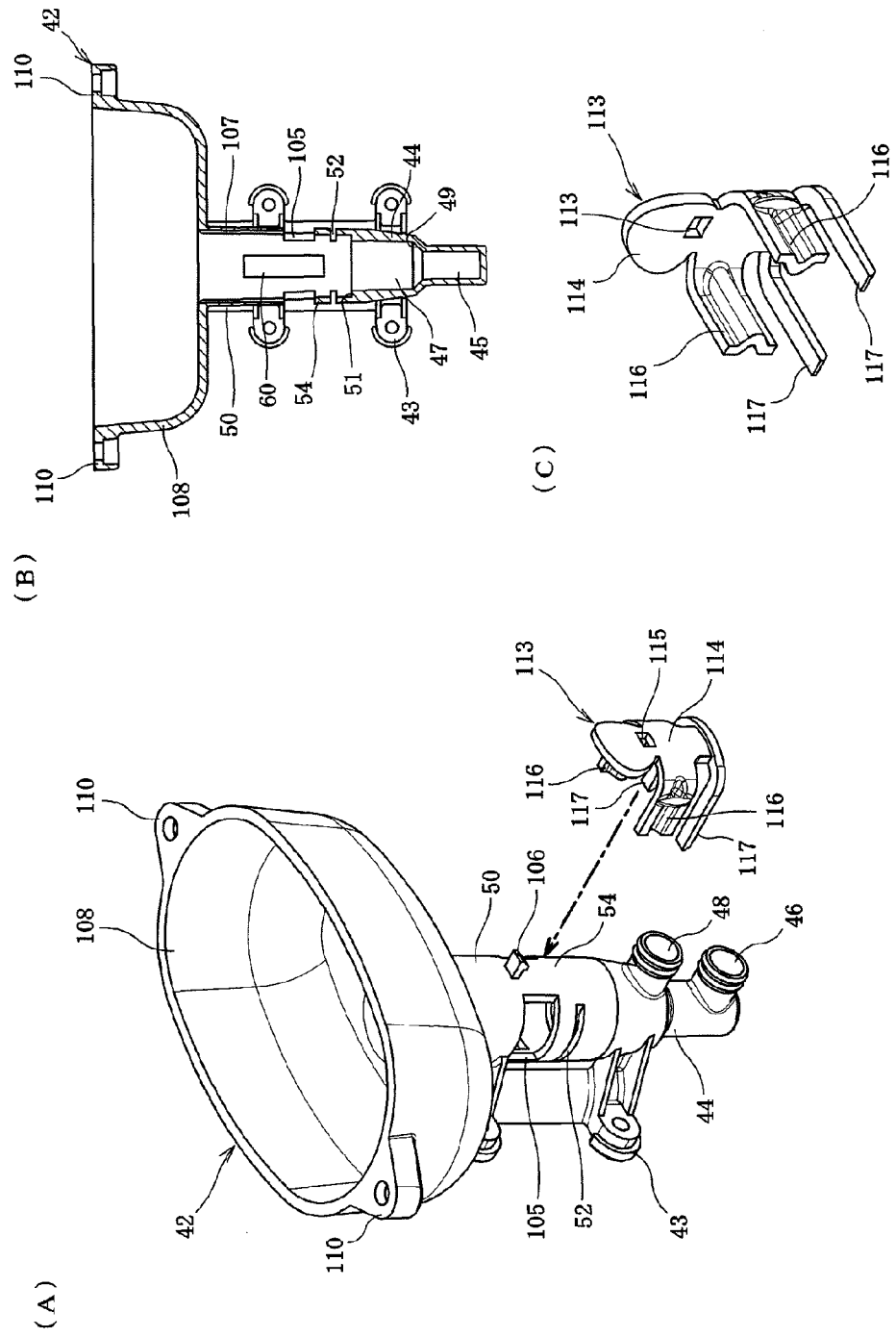
FIG. 11(A) shows a casing and a first retention mechanism of the control apparatus according to the third embodiment.
FIG. 11(B) is a cross sectional view of the casing.
FIG. 11(C) is a perspective view of the first retention mechanism.

The switching valve mechanism 41 is provided with the casing 42, the switching valve body 61 which is arranged in the inner portion of the casing 42 so as to be linearly movable, and the first retention mechanism which retains the switching valve body 61 at the open position and the closed position, as shown in FIG. 8 and FIGS. 9(A) and 9(B).

As shown in FIG. 8, FIG. 10, and FIGS. 11(A) and 11(B), the casing 42 is provided with the vacuum valve connection portion 44 in the lower portion and the actuator connection portion 50 in the upper portion. The casing 42 is provided with four fixing arm portions 43 which are fixed to the bracket member via the holder 118.

The vacuum valve connection portion 44 is provided with the first pressure change chamber 45 which is formed with the first connection portion 46 connected to the discharge port 13 of the vacuum valve 10, and the second pressure change chamber 47 which is formed with the second connection portion 48 connected to the pressure chamber 32 of the vacuum valve 10. The pressure-contacted portion 49 having an inverted conical tubular shape is formed therebetween.

The actuator connection portion 50 includes the pressure contact step portion 51 for sealing in the boundary portion with the vacuum valve connection portion 44. The slit-shaped first insertion holes 52 and 52 which are notched so as to be communicated with the internal space of the actuator connection portion 50 are provided above the pressure contact step portion 51. The arrangement portion 54 of a toggle member 113 constituting the first retention mechanism is provided above the first insertion hole 52. The toggle member arrangement portion 54 according to the present embodiment is provided with a pair of elastic retention portion insertion grooves 105 and 105 which extend in parallel to the first insertion holes 52 and 52, and a locking piece 106 which is provided in a protruding manner in an opposite direction to the fixing arm portion 43 so as to be positioned therebetween, so as to be communicated with the internal space of the actuator connection portion 50.

Further, the actuator connection portion 50 is provided with the insertion groove 60 which is communicated with the internal space, so as to be positioned between the fixing arm portions 43 and 43 which are adjacent in a transverse direction. Further, the actuator connection portion 50 is provided with a guide groove 107 which extends from an upper end to an elastic retention portion insertion groove 105.

An accommodating portion 108 for accommodating the second retention mechanism of the second actuator 79 is provided in the upper portion of the actuator connection portion 50. The accommodating portion 108 is formed in an elliptic shape in plan view and is connected to the upper end of the actuator connection portion 50. An open end of the accommodating portion 108 is provided with a connecting portion 110 which has a hole for connecting the second upper case 81 of the second actuator 79 so as to be positioned at an outer peripheral portion in a longer diameter side.

Figure 12:
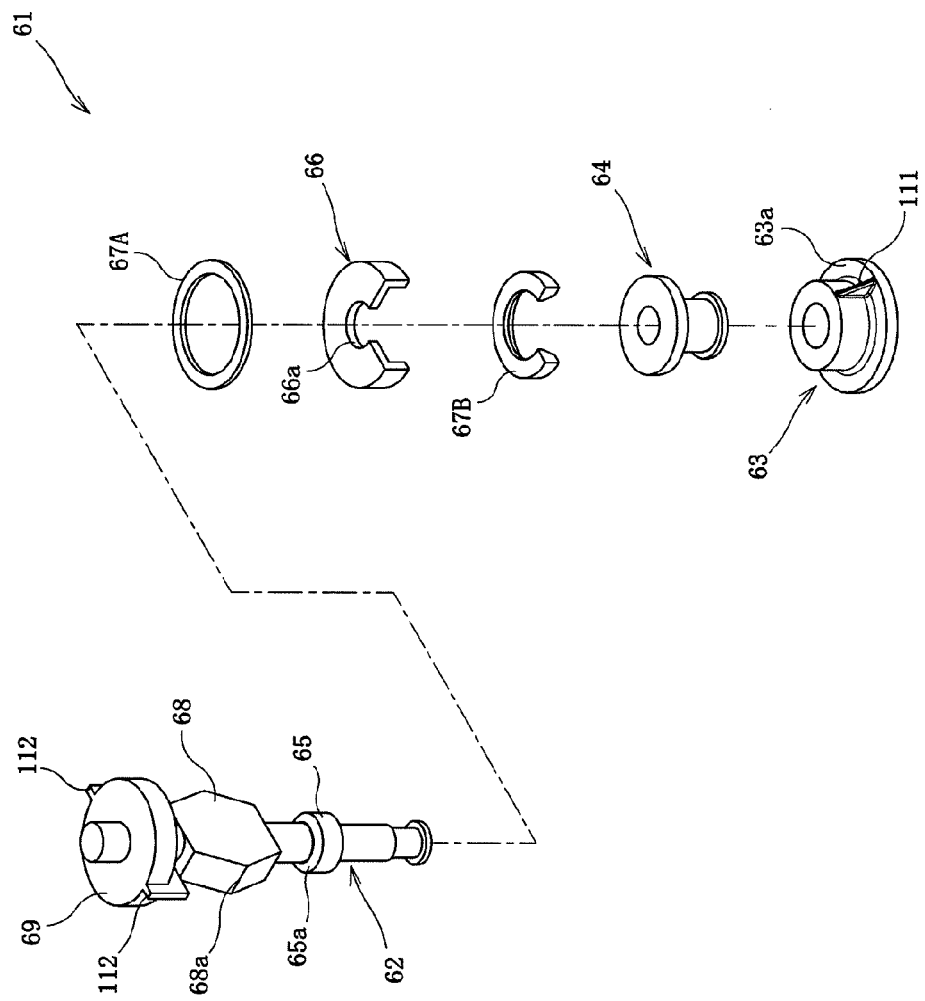
FIG. 12 is an exploded perspective view showing a switching valve body according to the third embodiment.
Figure 13:
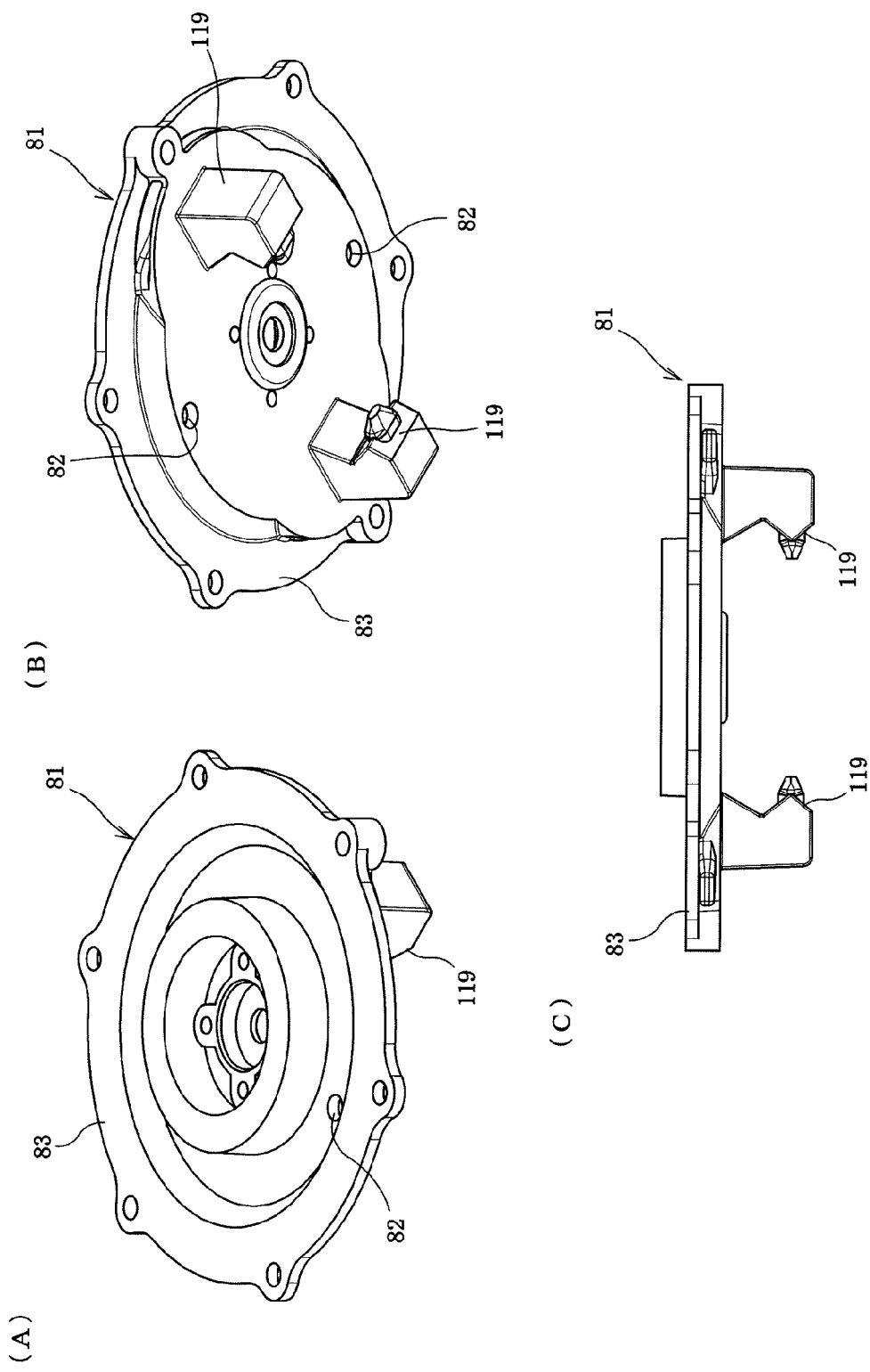
Figure 14:
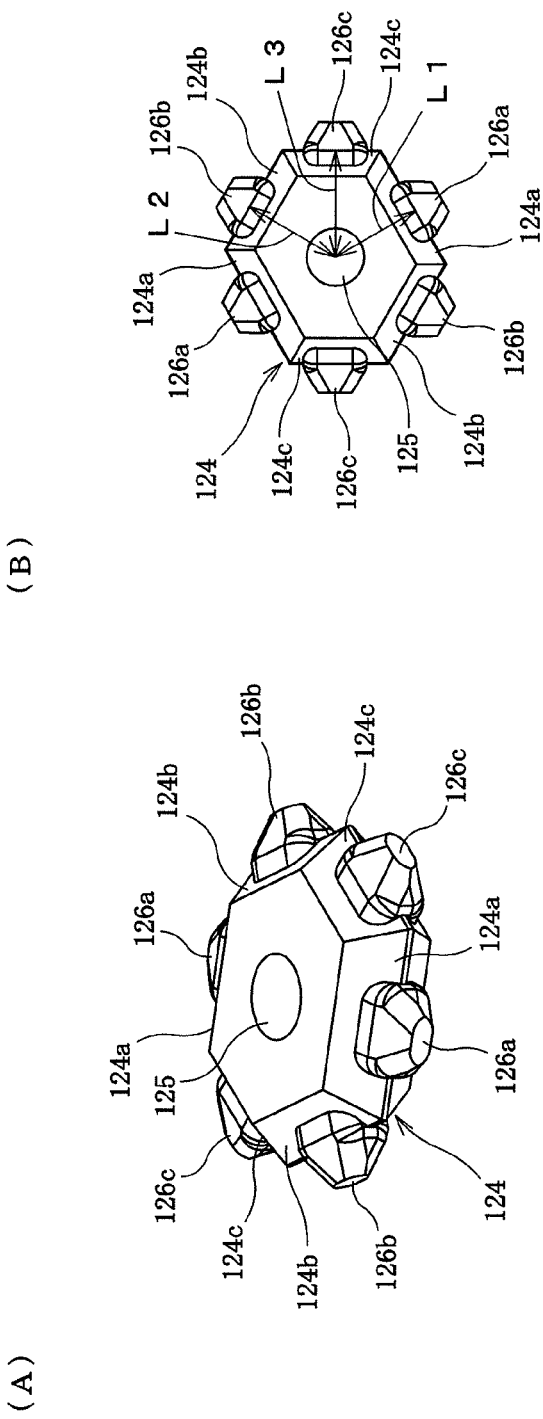

The switching valve body 61 moves to an open position shown in FIG. 9(A) by being actuated by the first actuator 71 so as to open, and moves to an open position shown in FIG. 9(B) by being actuated by the second actuator 79 so as to close. In the valve gasket 63 which is arranged in the lower end of the valve rod 62 of the switching valve body 61, a reinforcing rib portion 111 for forming a high rigidity portion having rigidity higher than the other portion is provided in a part of a soft seal portion 63a which is brought into pressure contact with the pressure-contacted portion 49 of the vacuum valve connection portion 44, as shown in FIG. 12. The reinforcing rib portion 111 is provided so as to obliquely extend to an outer peripheral edge of the seal portion 63a from a cylindrical base portion, as seen from a moving direction of the switching valve body 61. In other words, the seal portion 63a according to the present embodiment is formed such that the thickness is not uniform.

The guide member 64 as a separate body is arranged in the valve rod 62 of the switching valve body 61, and the upper portion thereof is provided with the stopper portion 65 having the pressure contact portion 65a. The seal member 66 brought into pressure contact with the pressure contact step portion 51 is installed above the stopper portion 65, and the reinforcing members 67A and 67B are arranged above and below the seal member 66.

The bulging portion 68 formed above the seal member 66 is configured by a plate portion which is formed in a rectangular shape in plan view, and is formed in a rhomboid shape in side view. The passive flange portion 69 protruding outward in the diametrical direction is provided above the bulging portion 68, and a guide piece 112 is provided in a protruding manner in an outer peripheral portion of the passive flange portion 69. The guide piece 112 is engaged with the guide groove 107 of the actuator connection portion 50, thereby regulating the switching valve body 61 so as to be non-rotatable within the actuator connection portion 50.

The first retention mechanism is configured by the resin toggle member 113 which is arranged in such a manner as to be outwardly fitted to the toggle member arrangement portion 54 of the actuator connection portion 50. The toggle member 113 is curved so as to form a circular arc shape in plan view, and is provided with a base plate portion 114 which is arranged in an opposite side to the fixing arm portion 43 in the actuator connection portion 50, as shown in FIGS. 11(A) and 11(C). The base plate portion 114 is provided with a locking hole 115 through which the locking piece 106 of the actuator connection portion 50 passes so as to be locked.

Further, the toggle member 113 is provided with a pair of elastic retention portions 116 and 116 which are fitted to the elastic retention portion insertion groove 105 of the actuator connection portion 50 and protrude to the internal space of the actuator connection portion 50. The elastic retention portion 116 retains the switching valve body 61 at the open position or the closed position by coming into line contact with the inclined surface of the bulging portion 68 of the switching valve body 61 positioned within the actuator connection portion 50.

Further, the toggle member 113 is provided in a lower end of the base plate portion 114 with a pair of locking portions 117 and 117 which are inserted to the first insertion holes 52 and 52 of the actuator connection portion 50 and position the upper end of the seal member 66.

As mentioned above, according to the third embodiment, the pair of toggle springs 123 and 70 and the locking members 53 and 53 shown in the first embodiment are configured by one toggle member 113, and the nut 57 and the thread shaft portion 55 are not necessary, thereby achieving a reduction of the number of the parts and downsizing.

The first actuator 71 is provided with the opening actuation member 76 which moves the switching valve body 61 in conjunction with the ascent and descent of the float 72. The connecting rod 73 of the float 72 has such a dimension that the float 72 does not land on the waste water in a state in which the waste water within the water storage basin 1 is lowered to the second water level LWL. The opening actuation member 76 is provided with the actuation portion 77 which passes through the insertion groove 60 so as to protrude into the actuator connecting portion 50. The opening actuation member 76 is installed by the holder 118 which is connected to the fixing arm portion 43 so as to be movable and undetachable.

The second actuator 79 is structured such as to be different from the water shut-off valve driving actuator 17 of the vacuum valve 10. Particularly, the second actuator 79 is provided with the switching cylinder 80 of which inner portion is partitioned into the pressure detection chamber 94 and the second reference pressure chamber 93. The closing actuation member 99 for actuating the switching valve body 61 so as to close is arranged in the switching cylinder 80. The switching cylinder 80 is provided with the second lower case 81, the second upper case 85, the second diaphragm 92, the switching piston cup 95, and the second biasing spring 96. Further, in the present embodiment, in place of the second retention auxiliary mechanism configured by the magnets 97 and 98, and the regulating mechanism configured by the second fastened portion 87 and the second fastening member 89, there is arranged a second retention mechanism which retains the closing actuation member 99 at a retreated position (refer to FIG. 9(B)) and an advanced position (refer to FIG. 9(A)) by a predetermined retention force.

The second lower case 81 is configured by an approximately oval plate body which covers an upper end of the accommodating portion 108 of the actuator connection portion 50, as shown in FIGS. 13(A), 13(B), and 13(C). The second lower case 81 is provided with the second air vent hole 82 for sucking the ambient air so as to be positioned at an outer side of the accommodating portion 108. Further, the upper end of the second lower case 81 is provided with the coupling flange 83 which has the connection hole for coupling to the second upper case 85. Further, the center of the second lower case 81 is provided with the hole through which the closing actuation member 99 is inserted, and the second insertion member 84 (refer to FIG. 8) is arranged in an upper side thereof.

The second lower case 81 has, on its lower surface positioned within the accommodating portion 108 of the actuator connection portion 50, a pair of retention portions 119 and 119 which retain one end of the toggle spring 123 constituting the second retention mechanism. The retention portion 119 is provided with a protruding portion which protrudes downward from the second lower case 81, and a retention projection which protrudes toward an axis from the protruding portion.

As shown in FIG. 8 and FIGS. 9(A) and 9(B), the second upper case 85 is formed in a cylindrical shape in which an upper end is blocked and a lower end is opened. The second upper case 85 is provided with the coupling flange 86 which has the connection hole for coupling to the second lower case 81. Further, an upper end blocked portion of the second upper case 85 is provided with a positioning tube 120 which inhibits an upward movement of the switching piston cup 95 as well as outwardly fitting and positioning the second biasing spring 96, in such a manner as to protrude inward. Further, the third connection portion 90 connected to the discharge port 13 of the vacuum valve 10 is outwardly provided in a protruding manner so as to be positioned at the center of the positioning tube 120.

The second diaphragm 92 is structured such as to partition the inner portion of the switching cylinder 80 into the second reference pressure chamber 93 and the pressure detection chamber 94, and an outer peripheral portion thereof is sandwiched by the respective coupling flanges 83 and 86 of the second lower case 81 and the second upper case 85.

The switching piston cup 95 is arranged so as to be firmly fixed to the second diaphragm 92 in such a manner as to be positioned within the pressure detection chamber 94 of the switching cylinder 80. The switching piston cup 95 is installed so as to sandwich the second diaphragm 92 together with a sandwiching member 121 by arranging the sandwiching member 121 formed in a plate shape on a side of the second reference pressure chamber 93.

The second biasing spring 96 is arranged between the second fastening member 89 and the switching piston cup 95, and biases the switching valve body 61 toward the closing position via the switching piston cup 95 and the closing actuation member 99. The biasing force of the second biasing spring 96 according to the present embodiment is set in accordance with a relationship with the retaining force of the closing actuation member 99 by the second retention mechanism.

The closing actuation member 99 is configured by a rod which is passed through the sandwiching member 121 and a bottom center of the switching piston cup 95 so as to be connected. The closing actuation member 99 is provided with a retention member attaching portion 122 so as to be positioned within the accommodating portion 108 in whichever state of the retreated position and the advanced position. The retention member attaching member 122 is configured by grooves which are annularly provided at predetermined intervals, and a C-shaped stop ring or an E-shaped stop ring which is fitted to the grooves.

The second retention mechanism is provided with a pair of toggle springs 123 and 123 which bias the closing actuation member 99 toward the axis from the outer side. The toggle spring 123 is made of a coiled spring, has its one end retained by the retention portion 119 of the second lower case 81, and has its other end retained by the retention member 124 installed to the retention member attaching portion 122 of the closing actuation member 99.

As shown in FIGS. 14(A) and 14(B), the retention member 124 includes a plate body which has three sets of side portions 124a, 124b, and 124c, each pair positioned in parallel, and is formed in a hexagonal shape in plan view. An installation hole 125 for installing to the closing actuation member 99 is formed in the center of the retention member 124. Dimensions in a transverse direction of the first side portions 124a and 124a are the same, dimensions in a transverse directions of the second side portions 124b and 124b are the same, and dimensions in a transverse direction of the third side portions 124c and 124c are the same. Further, the first, second, and third side portions 124a, 124b, and 124c are formed in such a manner that the dimensions are different. Accordingly, dimensions (lengths) L1, L2, and L3 of perpendicular lines extending in an orthogonal direction to the side portions 124a to 124c from the installation hole 125 are respectively different.

The dimension L1 from the installation hole 125 to the first side portion 124a is formed so as to be smaller than the dimension L2 from the installation hole 125 to the second side portion 124b, and the dimension L2 to the second side portion 124b is formed so as to be smaller than the dimension L3 from the installation hole 125 to the third side portion 124c (L1<<L2<L3). The side portions 124a to 124c are respectively provided with first, second, and third spring retention portions 126a, 126b, and 126c each retaining the end portion of the toggle spring 123.

The retention member 124 can selectively retain the toggle spring 123 in a first retention state in which it is retained by the first spring retention portions 126a and 126a, a second retention state in which it is retained by the second spring retention portions 126b and 126b, and a third retention state in which it is retained by the third spring retention portions 126c and 126c. In each of the retention states, since a contraction percentage of the toggle spring 123 is different in accordance with the setting of the dimensions L1, L2 and L3 from the installation hole 125, it is possible to change the retention force retaining the closing actuation member 99 (the first retention state<the second retention state<the third retention state).

In the second retention mechanism, the retention member 124 is positioned at an upper side while extending beyond the retention portion 119 of the second lower case 81 at the retreated position of the closing actuation member 99. Accordingly, the toggle spring 123 is actuated in such a manner as to bias in a direction opposite to the biasing direction of the second biasing spring 96. Further, at the advanced position of the closing actuation member 99, the retention member 124 is positioned at a lower side while extending beyond the retention portion 119 of the second lower case 81. Accordingly, the toggle spring 123 is actuated in such a manner as to bias in the same direction as the biasing direction of the second biasing spring 96.

Accordingly, the biasing force of the second biasing spring 96 is set so as to become larger than the retention force (biasing force) at the time of installing the toggle spring 123 in the third retention state. Therefore, in the case of an unloaded condition at the retreated position, the biasing force of the second biasing spring 96 overcomes the biasing force of the toggle spring 123, and moves the closing actuation member 99 to the advanced position via the switching piston cup 95.

However, in the state of the retreated position, the second actuator 79 is retained by a retreated position retention force obtained by adding the vacuum suction force within the pressure detection chamber 94 communicating with the discharge port 13 of the vacuum valve 10, and the upward biasing force by the toggle spring 123. Accordingly, in the case where the retreated position retention force is greater than the biasing force of the second biasing spring 96, the second actuator 79 retains the retreated position shown in FIG. 9(A). If the degree of vacuum (vacuum suction force) within the pressure detection chamber 94 becomes lower, and the biasing force of the second biasing spring 96 becomes larger than the retreated position retention force, the second actuator 79 moves to the advanced position shown in FIG. 9(B). This advanced position is retained by an advanced position retention force obtained by adding the downward biasing force by the toggle spring 123 and the biasing force of the second biasing spring 96. Further, if the degree of vacuum within the pressure detection chamber 94 becomes higher, and the vacuum suction force becomes greater than the advanced position retention force, the second actuator 79 again moves to the retreated position shown in FIG. 9(A).

The second actuator 79 according to the present embodiment sets the retreated position retention force, that is, the second degree of vacuum P2 actuating the closing actuation member 99 so as to close lower than the first degree of vacuum P1 by which the vacuum valve 10 is actuated so as to open and close. Further, the advanced position retention force, that is, the third degree of vacuum P3 bringing the closing actuation member 99 back to the retreated position is set higher than the second degree of vacuum P2 and lower than the degree of vacuum within the vacuum water supply pipe 5. Further, a force Fc obtained by adding the biasing force of the second biasing spring 96 which has a correlation to the third degree of vacuum P3, and the biasing force of the toggle spring 123 in the first retention state is set larger than the buoyancy Fb of the float 72 (Fb<Fc).

Since the control apparatus 40 according to the third embodiment sets the second degree of vacuum P2 by which the second actuator 71 is actuated so as to close lower than the first degree of vacuum P1 by which the vacuum valve 10 is actuated so as to open and close, the water shut-off valve driving actuator 17 of the vacuum valve 10 executes the closing actuation prior to the second actuator 71 in the case where the degree of vacuum of the vacuum water supply pipe 5 is lowered. Accordingly, when the control apparatus 40 is installed, a check valve 127 which allows a fluid movement from the first pressure change chamber 45 to the discharge port 13 and inhibits a fluid movement in an opposite direction is interposed in the air tube 100A which connects the first connection portion 46 of the switching valve mechanism 41 and the discharge port 13 of the vacuum valve 10. Accordingly, the closing actuation is not executed even if the degree of vacuum of the vacuum water supply pipe 5 becomes lower than the first degree of vacuum P1 by which the vacuum valve 10 is actuated so as to close.

Next, a description will be given of a motion of the vacuum type sewage line system to which the control apparatus 40 according to the third embodiment is applied.

Figure 15A:
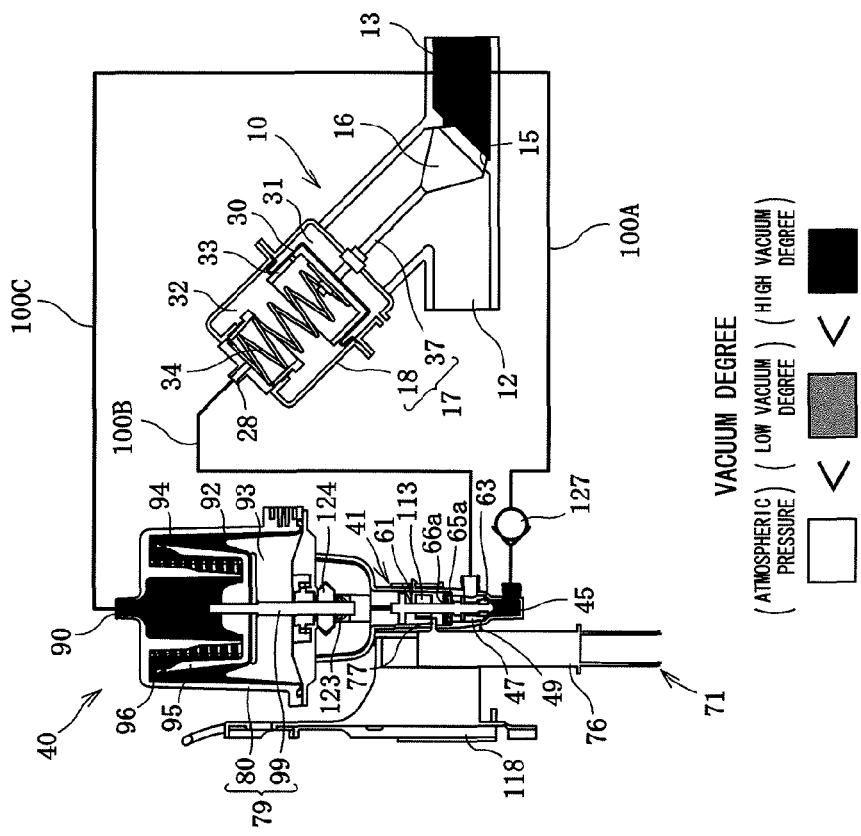
FIG. 15A is a schematic view showing a non-actuated state of the control apparatus according to the third embodiment.

As shown in FIG. 15A, in a state in which the waster water inside the water storage basin 1 is reserved only to the lower side of the water suction pipe 8, the switching valve body 61 of the control apparatus 40 is moved to the closed position, and this state is retained by the retention force of the elastic retention portion 116 of the toggle member 113. In this state, the water suction port 12 of the vacuum valve 10 comes to the atmospheric pressure state, and the discharge port 13 of the vacuum valve 10 comes to the state in which the degree of vacuum is high and is equal to or more than the first degree of vacuum P1. Accordingly, the first pressure change chamber 45 of the switching valve mechanism 41 of the control apparatus 40 comes to a state which is equal to or more than the first degree of vacuum P1, and the pressure detection chamber 94 of the second actuator 79 of the control apparatus 40 comes to a state which is above the second degree of vacuum P2. As a result, the closing actuation member 99 comes to a non-actuated state retreated via the switching piston cup 95. Further, in the switching valve mechanism 41 of the control apparatus 40, the switching valve body 61 moves to the closed position, and the second pressure change chamber 47 comes to the ambient air open state through the through hole 66a and the insertion groove 60. Accordingly, the pressure chamber 32 of the vacuum valve 10 which communicates with the second pressure change chamber 47 comes to the ambient air open state, and comes to the valve closed state.

Further, if the waste water is reserved within the water storage basin 1, and the float 72 lands on the water so as to rise to the first water level HWL, the opening actuation member 76 is moved upward. As a result, the switching valve body 61 moves upward to the open position against the retention force of the elastic retention portion 116 of the toggle member 113, and the open position is retained by the retention force of the elastic retention portion 116 of the toggle member 113.

Figure 16:
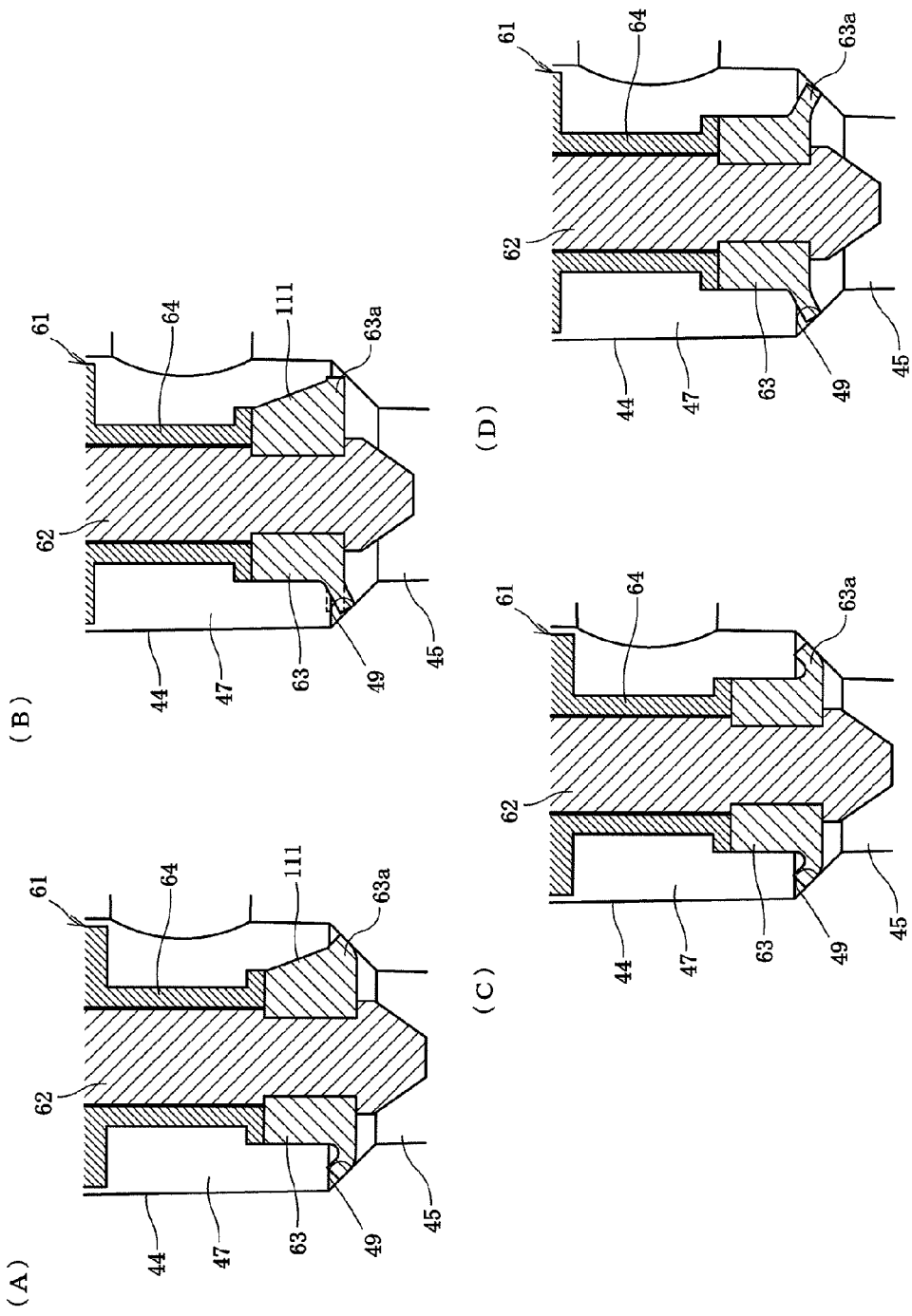
FIGS. 16(A) and 16(B) are cross sectional views showing a state of a valve gasket when the switching valve body is actuated so as to open.
FIGS. 16(C) and 16(D) are cross sectional views showing a state of a conventional valve gasket.

At this time, the valve gasket 63 of the switching valve body 61 is actuated in such a manner that the seal portion 63a comes into close contact with the pressure-contacted portion 49 of the vacuum valve connection portion 44 by the suction toward the discharge port 13 caused by the negative pressure, as shown in FIG. 16(A). Further, in the present embodiment, a reinforcing rib portion 111 is provided in a part of the valve gasket 63 and enhances rigidity as compared with the other portions. Accordingly, when being actuated to the open position, a position of the reinforcing rib portion 111 having a great repulsion force is immediately separated from the pressure-contacted portion 49, as shown in FIG. 16(B). As a result, the air is sucked from the gap, whereby a close attaching action of the soft seal portion 63a having high sealing performance is dissolved.

In the case of the valve gasket 63 in which the reinforcing rib portion 111 is not provided in the seal portion 63a as in the present embodiment, an extension is generated in the seal portion 63a and a boundary with the base portion is bent and deformed, due to the pressure attachment to the pressure-contacted portion 49 and the sucking action caused by the negative pressure, as shown in FIGS. 16(C) and 16(D). As a result, the seal portion 63a is hard to be separated from the pressure-contacted portion 49, and a stress caused by the deformation is concentrated on the boundary between the seal portion 63a and the base portion. Therefore, a cut is generated with time in the boundary portion. However, in the present embodiment, it is possible to prevent such a problem from being generated by forming the reinforcing rib portion 111.

Figure 15B:
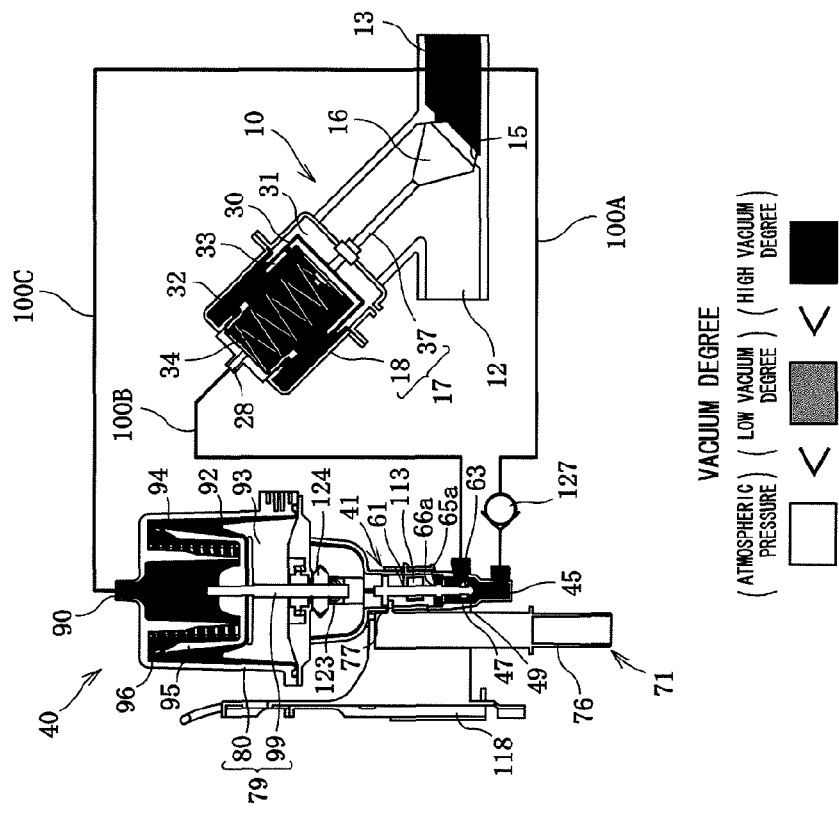
FIG. 15B is a schematic view showing a state in which a switching valve body is actuated so as to open.
Figure 15C:
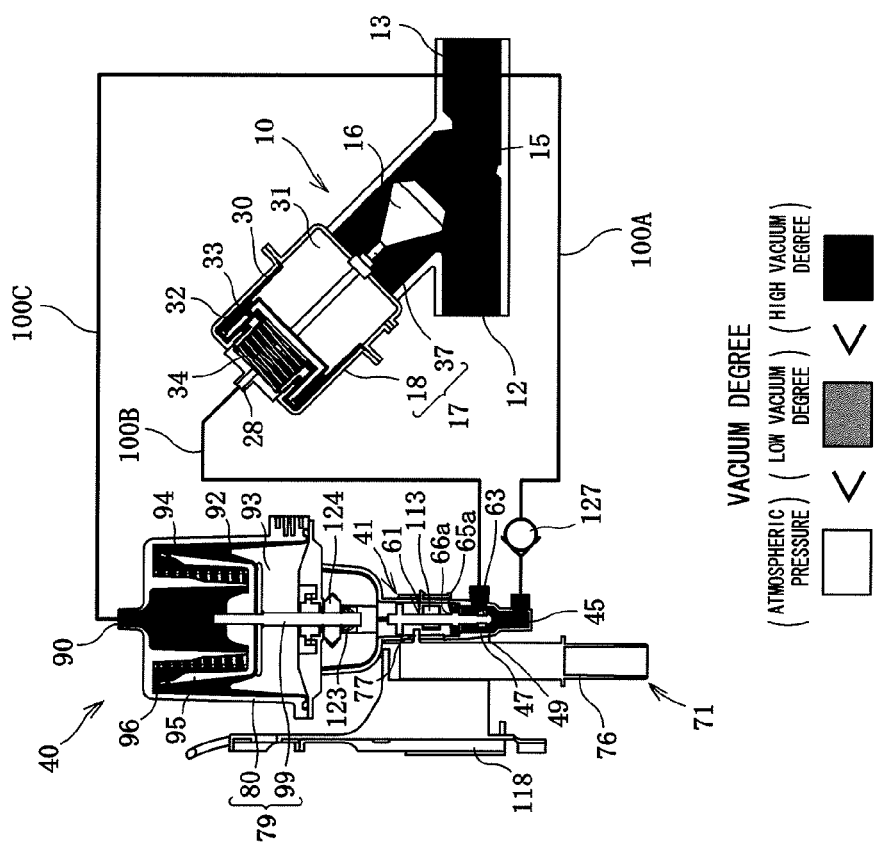
FIG. 15C is a schematic view showing a sate in which a water shut-off valve body is actuated so as to open according to FIG. 15B.

If the switching valve body 61 is actuated so as to open as mentioned above, the first pressure change chamber 45 and the second pressure change chamber 47 of the control apparatus 40 are communicated, and the through hole 66a of the seal member 66 is blocked by the pressure contact portion 65a of the switching valve body 61, as shown in FIG. 15B. As a result, the second pressure change chamber 47 of the control apparatus 40 is shut off from the ambient air, and becomes equal to or more than the first degree of vacuum P1, and the pressure chamber 32 of the vacuum valve 10 comes to the degree of vacuum which is equal to or more than the first degree of vacuum P1. Accordingly, the vacuum valve 10 comes to a valve open state in which the water shut-off valve driving actuator 17 is actuated so as to open, and the water suction port 12 and the discharge port 13 are communicated, as shown in FIG. 15C. Accordingly, the waste water within the water storage basin 1 is drained via the water suction pipe 8, the pipe body 11 of the vacuum valve 10, the gate valve 7, and the vacuum water supply pipe 5 by the suction action of the vacuum station.

If the waste water within the water storage basin 1 is lowered to near the lower end of the water suction pipe 8 by the drainage, the air is mixed into the sucked water from the water suction pipe 8, and the degree of vacuum within the discharge port 13 becomes lower than the first degree of vacuum P1 by which the vacuum valve 10 executes the closing actuation, as shown in FIG. 15D. Accordingly, the fluid including the waste water and the air tend to flow into the pressure chamber 32 of the vacuum valve 10 from the discharge port 13 of the vacuum valve 10 having the low degree of vacuum via the first pressure change chamber 45 and the second pressure change chamber 47 of the switching valve mechanism 41 having the high degree of vacuum. However, in the present embodiment, since the check valve 127 is arranged in the air tube 100A connecting them, the fluid movement from the discharge port 13 toward the first connection portion 46 is inhibited. As a result, in the vacuum valve 10, the degree of vacuum in the pressure chamber 32 is maintained to equal to or more than the first degree of vacuum P1 regardless of the degree of vacuum of the discharge port 13, and the valve open state can be maintained.

Figure 15F:
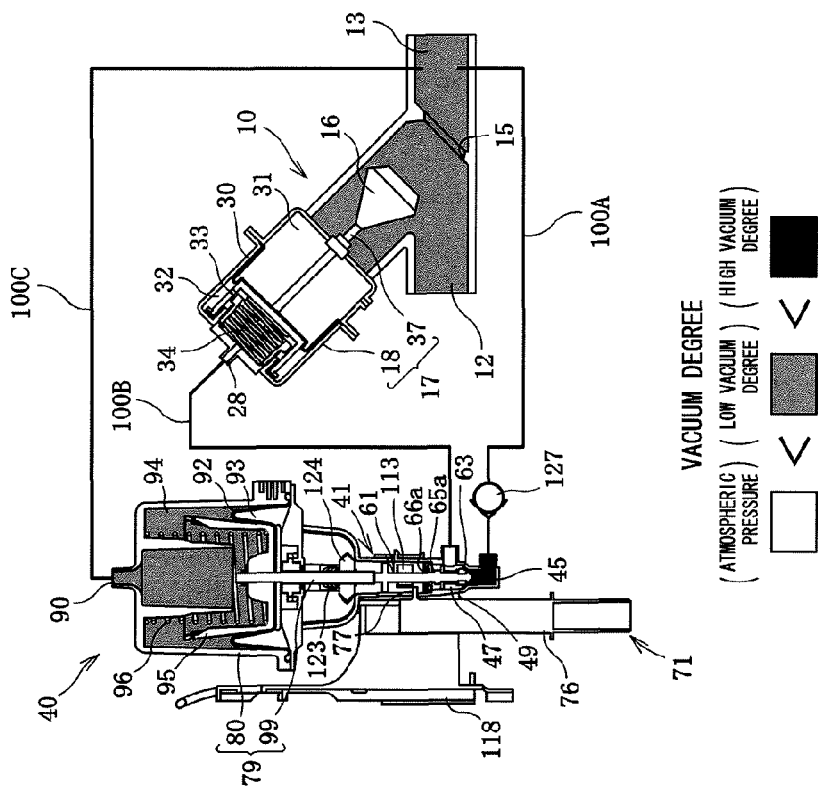
FIG. 15F is a schematic view showing a changed state of the degree of vacuum caused by the valve closing actuation of the switching valve body.

Further, if the waste water within the water storage basin 1 is drained to the second water level LWL, the air mixing amount is increased, and the degree of vacuum within the discharge port 13 becomes equal to or less than the second degree of vacuum P2, the second actuator 79 is actuated so as to close, thereby moving the switching valve body 61 to the closed position, as shown in FIG. 15E. Accordingly, as shown in FIG. 15F, the control apparatus 40 comes to a state in which the communication between the first pressure change chamber 45 and the second pressure change chamber 47 is shut off, and the second pressure change chamber 47 is opened to the ambient air through the through hole 66a of the seal member 66 and the insertion groove 60. Accordingly, the degree of vacuum within the pressure chamber 32 of the vacuum valve 10 comes to the atmospheric pressure state which is lower than the first degree of vacuum P1.

Figure 15H:
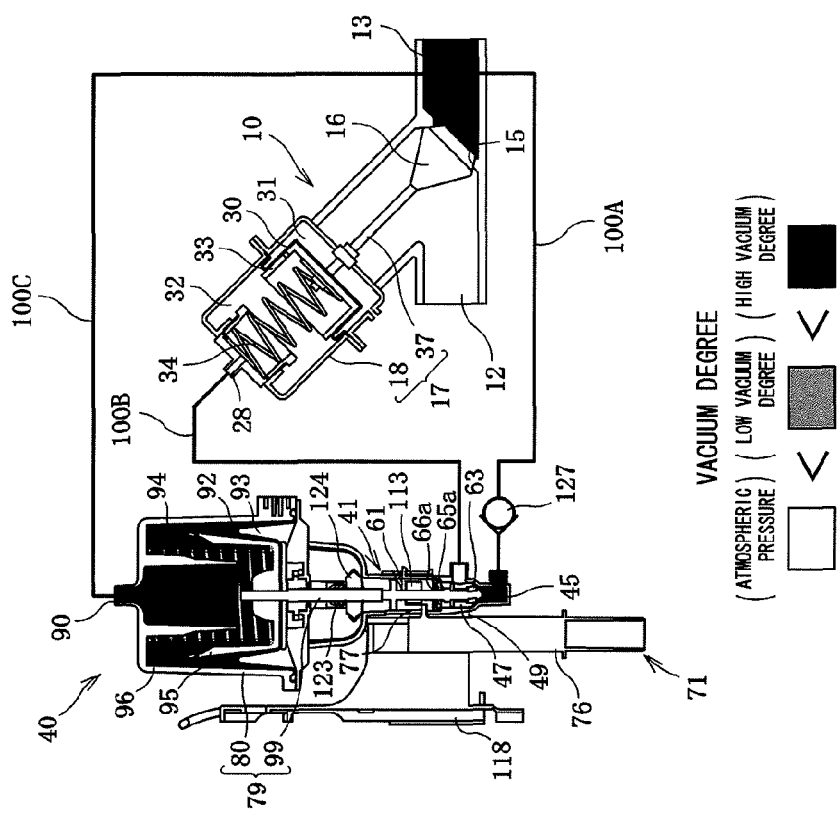
FIG. 15H is a schematic view showing a changed state of the degree of vacuum caused by the valve closing actuation of the water shut-off valve body.

As a result, as shown in FIG. 15G, the water shut-off valve body 16 is moved to the closed position, and the vacuum valve 10 comes to the valve closed state. Accordingly, the drainage from the water suction port 12 of the vacuum valve 10 via the discharge port 13 is stopped. Further, by the shutting off of the valve port 15, the degree of vacuum of the discharge port 13 becomes equal to or more than the first degree of vacuum P1 and higher than the third degree of vacuum P3, as shown in FIG. 15H. As a result, the second actuator 79 moves to a retreated position at which the closing actuation member 99 is retreated, and comes to a state shown in FIG. 15A.

The control apparatus 40 according to the third embodiment structured as mentioned above can obtain the same operations and effects as those of the first embodiment.

Further, in the present embodiment, by interposing the check valve 127 in the air tube 100A which connects the first pressure change chamber 45 of the switching valve mechanism 41 and the discharge port 13, it is possible to set the second degree of vacuum P2 by which the second actuator 71 is actuated so as to close lower than the first degree of vacuum P1 by which the vacuum valve 10 is actuated so as to open and close. Therefore, it is possible to set the intake amount of the air from the water suction pipe 8 large. As a result, in the case of the usage environment in which a lot of scum is discharged, it is possible to sufficiently drain the scum.

Further, the second actuator 79 is structured such as to be retained at the advanced position and the retreated position by the toggle spring 123 which biases the closing actuation member 99 toward the axis from the outer side. Accordingly, it is possible to easily set the force Fc for moving the switching valve body 61 from the open position to the closed position larger than the buoyancy Fb of the float 72. Further, the biasing force by the toggle spring 123 is structured such that its setting can be easily changed by the retention member 124 having the first, second, and third spring retention portions 126a, 126b, and 126c. Accordingly, it is possible to improve workability for setting and changing the second degree of vacuum P2 which is actuated so as to close the second actuator 79 in accordance with the installed environment.

Further, the valve gasket 63 of the switching valve body 61 shutting off the communication between the first pressure change chamber 45 and the second pressure change chamber 47 of the switching valve mechanism 41 enhances only partial rigidity by providing the reinforcing rib portion 111. Accordingly, when being moved to the open position by the first actuator 71, the valve gasket 63 can be easily detached against the vacuum suction force from the portion in which the reinforcing rib portion 111 is formed. Accordingly, since the stress concentration generated in the soft seal portion 63a can be reduced, it is possible to make the useful life of the valve gasket 63 long.

The control apparatus 40 of the vacuum valve 10 according to the present invention is not limited to the structure according to the embodiment mentioned above, but can be variously changed.

For example, the regulating mechanisms which regulate the biasing forces of the biasing springs 34 and 96 according to the first and second embodiments are not limited to the structures of the fastened portions 25 and 87 and the fastening members 27 and 89, but can be changed according to demand. Further, the retention auxiliary mechanism is not limited to the structures which use the magnets 35, 36, 97, and 98, and can be changed according to the request.

Further, in each of the embodiments, the pressures within the reference pressure chambers 31 and 93 of the water shut-off valve driving actuator 17 and the second actuator 79 are set to the atmospheric pressure generated by being opened to the ambient air, however, may be structured to seal a predetermined gas, liquid, or the like.

Further, in the embodiment mentioned above, the first retention mechanism which retains the switching valve body 61 at the open position and the closed position is configured by the toggle member obtained by integrally forming a pair of toggle springs 70 and 70 and the elastic retention portion, however, the first retention mechanism may be structured such that a spring for assisting the toggle is arranged between the fixing arm portion 43 and the opening actuation member 76 in order to enhance the retaining force. Needless to say, the first retention mechanism is not limited to a spring, but can be variously changed as long as a structure can retain the switching valve body 61 at the open position and the closed position by a predetermined retaining force.

Further, the third embodiment is structured such that the retention member 124 is provided with three kinds of spring retention portions 126a, 126b, and 126c, whereby it is possible to set and change in three stages, however, the number of the kinds of spring retention portions can be changed according to demand as long as it is two kinds or more. Further, in the third embodiment, the second degree of vacuum P2 by which the second actuator 71 is actuated so as to close is set lower than the first degree of vacuum P1 by which the vacuum valve 10 is actuated so as to open and close, however, it is possible to structure such that the retention state set lower than the first degree of vacuum P1 and the retention state set higher than the first degree of vacuum P1 may be selected, by the setting of the spring retention portions 126a, 126b, and 126c. In this case, the check valve 127 is arranged in the air tube 100A if necessary.

Further, the same operations and effects can be obtained even if the valve gasket 63 according to the third embodiment in which the reinforcing rib portion 111 is provided as the high rigidity portion in a part of the seal portion 63a is applied to the control apparatus 40 according to the first and second embodiments.

Figure 17:
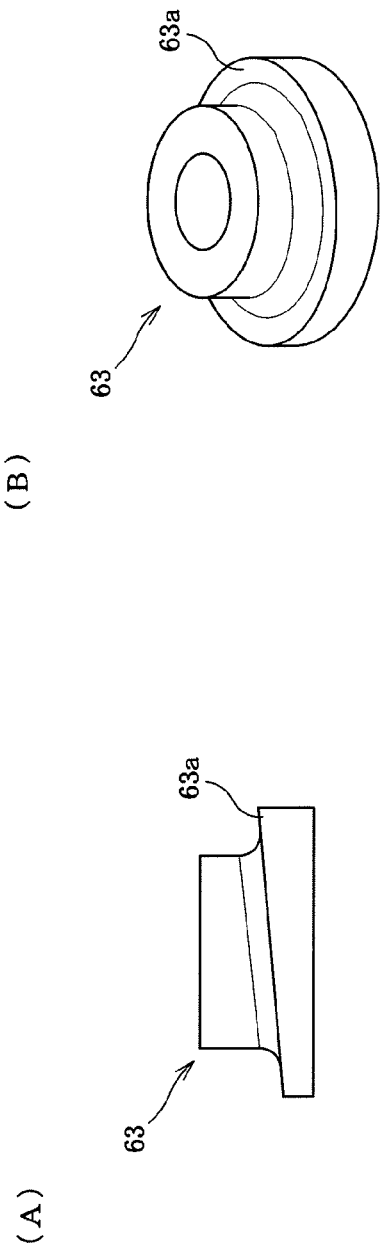
Figure 18:
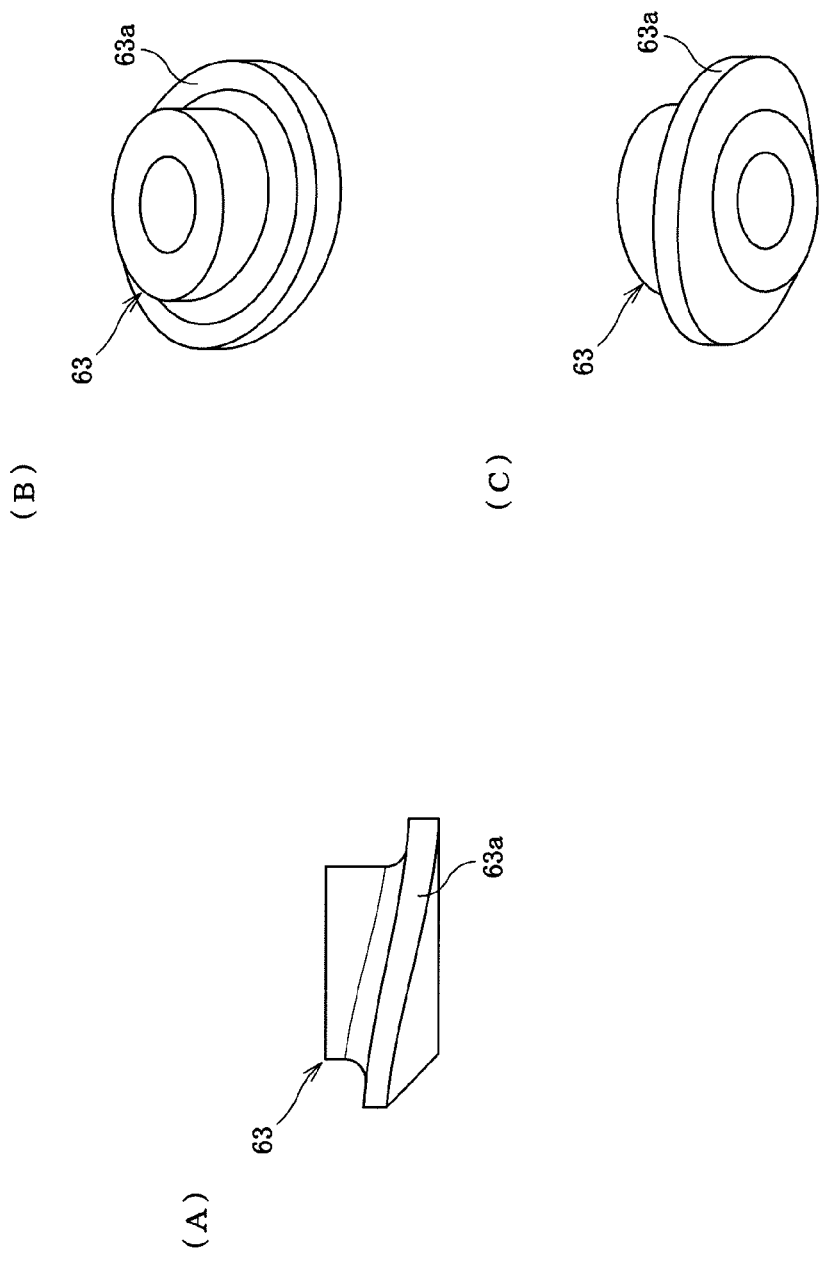
Figure 19:
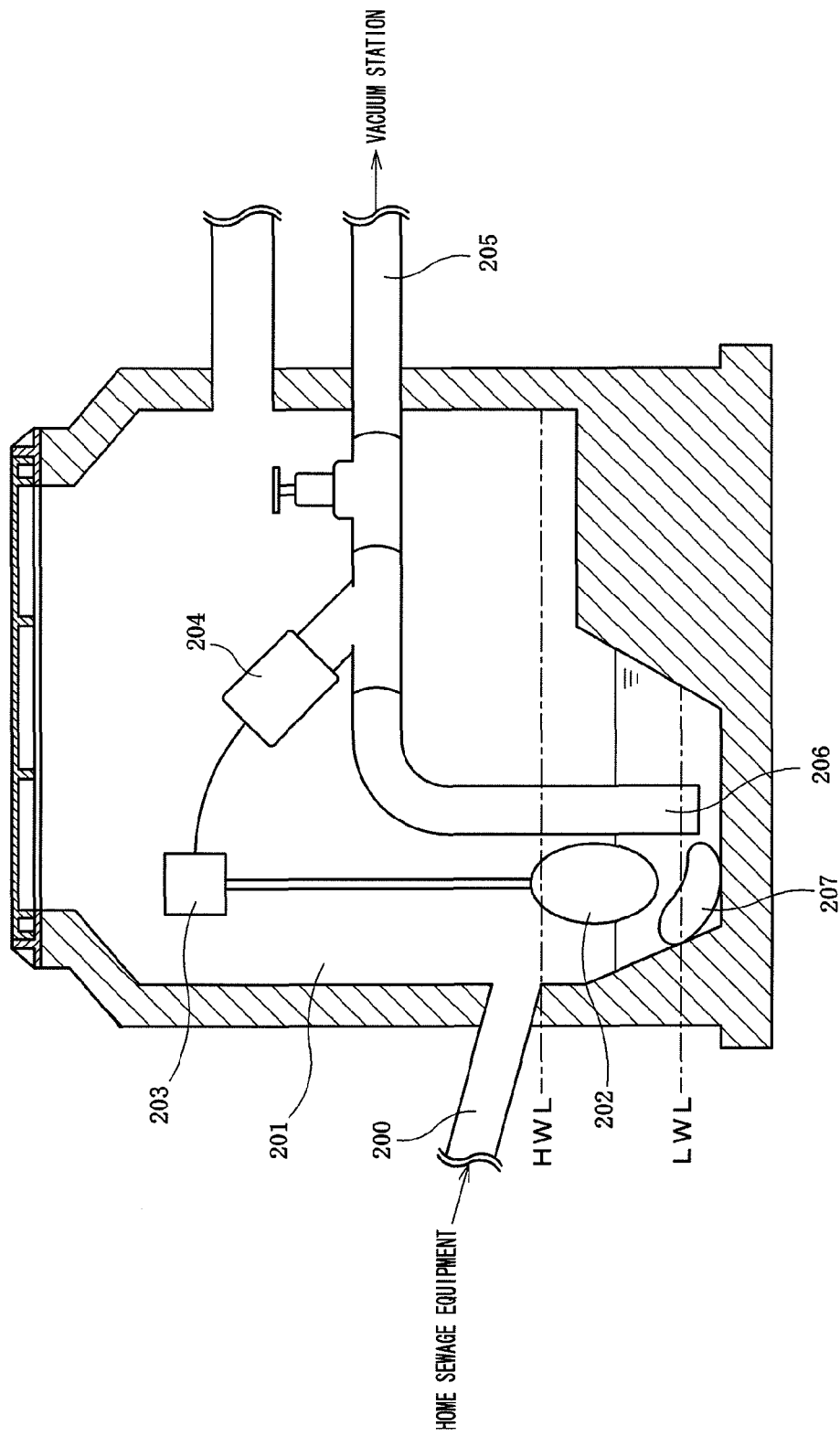
FIG. 19 is a conceptual view of a vacuum type sewage line system to which a conventional mechanical type control apparatus is applied.

Further, the structure in which the high rigidity portion is provided in a part of the seal portion 63a of the valve gasket 63 is not limited only to the reinforcing rib portion 111, but may be made such that a total thickness of the seal portion 63a becomes gradually larger from a predetermined position toward an opposed position as shown in FIGS. 17(A) and 17(B). Alternatively, as shown in FIGS. 18(A), 18(B), and 18(C), the seal portion 63a of the valve gasket 63 may have its lower end surface gradually formed in a conical shape coinciding with the shape of the pressure-contacted portion 49 from a predetermined position toward an opposed position. In this manner as well, it is possible to form the seal portion 63a such that the thickness of the seal portion 63a does not become uniform.

Further, in the embodiment mentioned above, the control apparatus 40 of the vacuum valve 10 according to the present invention is applied to the vacuum type sewage line system, however, it is possible to apply in the same manner as long as it is a vacuum water supply system which supplies water to a downstream side when a fixed amount of liquid is reserved within the waste storage basin 1.

The invention claimed is:

1. A control apparatus of a vacuum valve which is interposed between one end of a water suction pipe having the other end open to a water storage basin, and a vacuum-sucked vacuum water supply pipe, the vacuum valve being opened when a degree of vacuum within a pressure chamber becomes equal to or more than a first degree of vacuum and closed when the degree of vacuum within the pressure chamber becomes lower than the first degree of vacuum, the control apparatus of the vacuum valve comprising:

a switching valve mechanism having a casing formed with a first pressure change chamber communicated with the vacuum water supply pipe and a second pressure change chamber communicated with a pressure chamber of the vacuum valve, a switching valve body arranged within the casing so as to be linearly movable between an open position where the first pressure change chamber is communicated with the second pressure change chamber, and a closed position where the communication between the first pressure change chamber and the second pressure change chamber is shut off, and a first retention mechanism retaining the switching valve body at the open position and the closed position by a previously set retention force;

a first actuator having an opening actuation member that is attached to the casing of the switching valve mechanism so as to be linearly movable along a linear moving direction of the switching valve body in conjunction with ascent and descent corresponding to a water level of a float accommodated within the water storage basin, the opening actuation member moving the switching valve body from the closed position to the open position against the retention force of the first retention mechanism when the float ascends to a previously set first water level; and a second actuator having a switching cylinder that is attached to the casing and is formed with a pressure detection chamber communicated with the vacuum water supply pipe in an inner portion thereof, and a closing actuation member that is linearly movable in the linear moving direction of the switching valve body, the closing actuation member advancing so as to move the switching valve body from the open position to the closed position against the retention force of the first retention mechanism when a degree of vacuum within the pressure detection chamber becomes equal to or less than a second degree of vacuum.

2. The control apparatus of a vacuum valve according to claim 1, wherein the second pressure change chamber of the casing of the switching valve mechanism is provided with a seal member that has a through hole communicating with ambient air, and the switching valve body blocks the through hole of the seal member in a state of being moved to the open position so as to shut off the second pressure change chamber from the ambient air, and opens the through hole of the seal member in a state of being moved to the closed position so as to communicate the second pressure change chamber with the ambient air.

3. The control apparatus of a vacuum valve according to claim 1, wherein a force for moving the switching valve body from the open position to the closed position by the closing actuation member of the second actuator is made larger than buoyancy of the float.

4. The control apparatus of a vacuum valve according to claim 3, wherein the switching cylinder of the second actuator includes:

a switching piston cup that is arranged within the pressure detection chamber; and a biasing spring that is contracted by a pressing force caused by a movement of the switching piston cup when the degree of vacuum within the pressure detection chamber becomes higher than the second degree of vacuum, and is expanded against the pressing force of the switching piston cup when the degree of vacuum within the pressure detection chamber becomes equal to or less than the second degree of vacuum, and the closing actuation member is connected to the switching piston cup, and the switching valve body is moved from the open position to the closed position by the biasing force of the biasing spring.

5. The control apparatus of a vacuum valve according to claim 4, wherein the second actuator further includes a retention auxiliary mechanism that retains a state in which the biasing spring is contracted via the switching piston cup by a weaker force than the biasing force of the biasing spring.

6. The control apparatus of a vacuum valve according to claim 5, wherein the vacuum valve includes:

a water shut-off cylinder that has an inner portion partitioned into the pressure chamber and a reference pressure chamber retained at a predetermined pressure, and has a water shut-off piston cup arranged within the pressure chamber, and a biasing spring contracted by a pressing force caused by a movement of the water shut-off piston cup when the degree of vacuum within the pressure chamber becomes equal to or more than the first degree of vacuum, and expanded against the pressure force of the water shut-off piston cup when the degree of vacuum within the pressure chamber becomes lower than the first degree of vacuum;

an opening and closing actuation member that is connected to the water shut-off piston cup, moves a water shut-off valve body to an open position based on the contraction of the biasing spring, and moves the water shut-off valve body to a closed position by expansion of the biasing spring; and a retention auxiliary mechanism that retains a state in which the biasing spring is contracted via the water shut-off piston cup with a force weaker than the biasing force of the biasing spring.

7. The control apparatus of a vacuum valve according to claim 1, wherein the switching cylinder of the second actuator is partitioned into the pressure detection chamber and a reference pressure chamber retained at a predetermined pressure, and the closing actuation member moves the switching valve body from the open position to the closed position when the degree of vacuum within the pressure detection chamber becomes equal to or less than the second degree of vacuum that is lower than the reference pressure within the reference pressure chamber.

8. The control apparatus of a vacuum valve according to claim 1, wherein
the second degree of vacuum by which the second actuator advances so as to move the switching valve body to the closed position is set higher than the first degree of vacuum by which the vacuum valve is actuated so as to open and close.

9. The control apparatus of a vacuum valve according to claim 1, wherein
the second degree of vacuum by which the second actuator advances so as to move the switching valve body to the closed position is set lower than the first degree of vacuum by which the vacuum valve is actuated so as to open and close, and
a check valve is arranged in a connection piping that connects the first pressure change chamber of the casing of the switching valve mechanism and the vacuum water supply pipe, the check valve allowing a fluid movement from the first pressure change chamber to the vacuum water supply pipe and inhibiting an opposite fluid movement.

10. The control apparatus of a vacuum valve according to claim 1, wherein
the second actuator has a second retention mechanism that retains the closing actuation member at an advanced position and a retreated position by a previously set retention force.

11. The control apparatus of a vacuum valve according to claim 10, wherein
the second retention mechanism includes a toggle spring that biases the closing actuation member toward an axis from an outer side, and
the closing actuation member is provided with a retention member that has a first spring retention portion retaining an end portion of the toggle spring, and a second spring retention portion retaining the end portion of the toggle spring in an outer side of the first spring retention portion, and the retention force of the closing actuation member is made changeable by selectively making the first and second spring retention portions retain the toggle spring.

12. The control apparatus of a vacuum valve according to claim 1, wherein
a seal portion of a valve gasket of the switching valve body that shuts off communication between the first pressure change chamber and the second pressure change chamber of the casing of the switching valve mechanism has in a part thereof a high rigidity portion with rigidity higher than other parts, as seen from a moving direction of the switching valve body.

\* \* \* \* \*